United States Patent
Chow et al.

(10) Patent No.: US 11,930,989 B2
(45) Date of Patent: *Mar. 19, 2024

(54) REDUCING CLEANING ROLLER AMPLITUDE AND SPEED OSCILLATIONS OF A CLEANING ROBOT

(71) Applicant: iRobot Corporation, Bedford, MA (US)

(72) Inventors: Hao-Yun Chow, Kaohsiung (TW); Patrick Chow, Santa Clarita, CA (US); Ke Ting Gao, Shenzhen (CN); Fangzheng Guo, Arlington, MA (US); Jennifer Ann Mauger, Arlington, MA (US); Rogelio Manfred Neumann, Somerville, MA (US); Jian Yun Pi, GaoAn (CN); Michael G. Sack, Westford, MA (US); Rubal Verma, Lowell, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,153

(22) Filed: May 30, 2023

(65) Prior Publication Data

US 2023/0301477 A1 Sep. 28, 2023

Related U.S. Application Data

(63) Continuation of application No. 17/846,484, filed on Jun. 22, 2022, now Pat. No. 11,678,780, which is a
(Continued)

(51) Int. Cl.
*A46B 13/02* (2006.01)
*A46B 13/00* (2006.01)
*A47L 9/04* (2006.01)

(52) U.S. Cl.
CPC .......... *A47L 9/0455* (2013.01); *A46B 13/001* (2013.01); *A46B 13/02* (2013.01);
(Continued)

(58) Field of Classification Search
CPC .............. A46B 9/04; A46B 13/02; A46B 9/02
See application file for complete search history.

(56) References Cited

U.S. PATENT DOCUMENTS 9,707,596 B2 * 7/2017 Woods ..................... A46B 3/18
10,512,384 B2 12/2019 Goddard et al.
(Continued)

FOREIGN PATENT DOCUMENTS

CN 213248840 5/2021

OTHER PUBLICATIONS

"Chinese Application Serial No. 202020743528.9, Response filed Feb. 3, 21 to Notification to Make Rectification dated Dec. 10, 2020", w English Claims, 28 pgs.
(Continued)

*Primary Examiner* — Michael D Jennings
(74) *Attorney, Agent, or Firm* — Schwegman Lundberg & Woessner, P.A.

(57) ABSTRACT

A roller assembly for a mobile cleaning system for cleaning a work surface can include a drive shaft, a sheath, a bushing, and a bushing shroud. The drive shaft can be rotatable about a drive axis, and the drive shaft can include a driven end and an opposite bushing end. The sheath can be supported by the drive shaft and the sheath can be rotatable with the drive shaft. The sheath can include a shell engageable with the work surface. The bushing can be located about the bushing end of the drive shaft. The bushing shroud can be connected to the bushing. The sheath and the drive shaft can be together rotatable with respect to the bushing and the bushing shroud, the bushing shroud can include an outer portion defining a
(Continued)

first radius of curvature and a recessed portion connected to the outer portion.

20 Claims, 14 Drawing Sheets

Related U.S. Application Data continuation of application No. 16/871,149, filed on May 11, 2020, now Pat. No. 11,369,242.

(60) Provisional application No. 62/846,091, filed on May 10, 2019.

(52) U.S. Cl.
CPC ......... *A47L 9/0477* (2013.01); *A46B 2200/30* (2013.01); *A47L 2201/00* (2013.01)

(56) References Cited

U.S. PATENT DOCUMENTS

| 10,595,624 | B2 | 3/2020 | Blouin et al. |
| 11,369,242 | B2 | 6/2022 | Chow et al. |
| 11,678,780 | B2 | 6/2023 | Chow et al. |
| 2017/0247896 | A1* | 8/2017 | Hayes ................... E04H 4/1636 |
| 2018/0327013 | A1* | 11/2018 | Ferrell .................. E04H 4/1654 |
| 2019/0208971 | A1* | 7/2019 | O'Brien .............. A47L 11/4041 |
| 2020/0352402 | A1 | 11/2020 | Chow et al. |
| 2022/0313037 | A1 | 10/2022 | Chow et al. |

OTHER PUBLICATIONS

"U.S. Appl. No. 16/871,149, Ex Parte Quayle Action mailed Mar. 29, 2022", 6 pgs.

"U.S. Appl. No. 16/871,149, Response filed Apr. 27, 2022 to Ex Parte Quayle Action mailed Mar. 29, 2022", 9 pgs.

"U.S. Appl. No. 16/871,149, Notice of Allowance dated May 13, 2022", 5 pgs.

"U.S. Appl. No. 17/846,484, Non Final Office Action dated Dec. 15, 2022", 6 pgs.

"U.S. Appl. No. 17/846,484, Response filed Mar. 15, 2023 to Non Final Office Action dated Dec. 15, 2022", 7 pgs.

"U.S. Appl. No. 17/846,484, Notice of Allowance dated Apr. 17, 2023", 7 pgs.

* cited by examiner

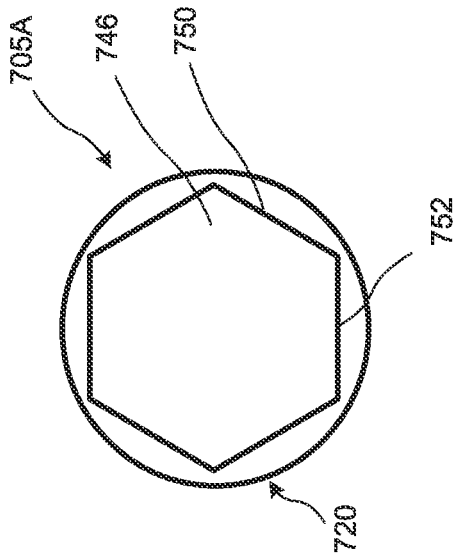
FIG. 7A
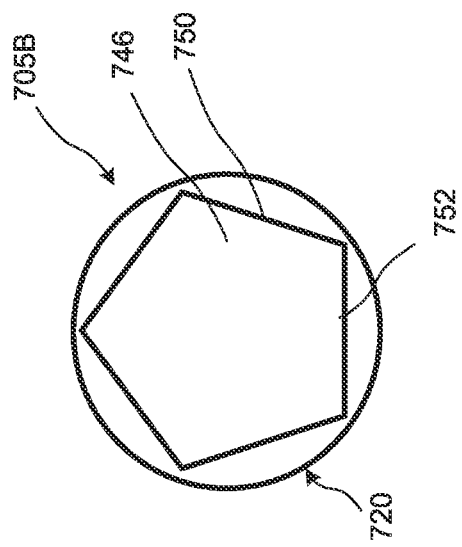
FIG. 7B
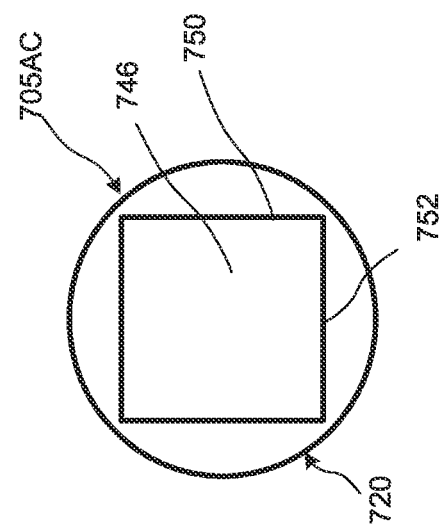
FIG. 7C
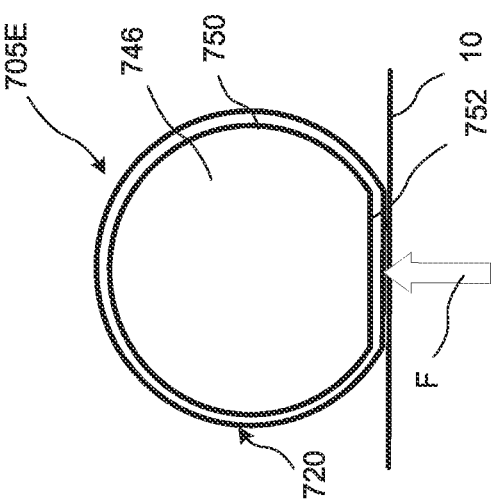
FIG. 7D
FIG. 7E
FIG. 7F

REDUCING CLEANING ROLLER AMPLITUDE AND SPEED OSCILLATIONS OF A CLEANING ROBOT

PRIORITY APPLICATIONS

This application is a continuation of U.S. patent application Ser. No. 17/846,484, filed Jun. 22, 2022, which is a continuation of U.S. patent application Ser. No. 16/871,149, filed May 11, 2020, issued on Jun. 28, 2022 as U.S. Pat. No. 11,369,242, which application claims the benefit of priority to U.S. Provisional Patent Application Ser. No. 62/846,091, filed May 10, 2019, the contents of all which are incorporated herein by reference in their entireties.

TECHNICAL FIELD

This specification relates to a cleaning roller, in particular, for cleaning robots.

BACKGROUND

An autonomous cleaning robot can navigate across a floor surface and avoid obstacles while vacuuming the floor surface to ingest debris from the floor surface. The cleaning robot can include rollers to pick up the debris from the floor surface. As the cleaning robot moves across the floor surface, the robot can rotate the rollers, which can guide the debris toward a vacuum airflow generated by the cleaning robot. In this regard, the rollers and the vacuum airflow can cooperate to allow the robot to ingest debris.

SUMMARY

In certain robotic vacuum cleaners, a cleaning roller can be used to pick up debris. The cleaning roller can be driven at a drive end or gearbox side. During operation, a shell of the cleaning roller can become pinched between the floor and a bushing shroud on a bearing end of the cleaning roller. Such pinching can cause successive episodes of decreased and then increased rotational speed of the cleaning roller at the bearing end. The inventors have recognized, among other things, that it may be possible to reduce or eliminate these fluctuations in rotational speed at the bearing end, such as by providing a bushing shroud having a reduced cross section in one or more portions, such as to provide additional compliance in the bearing end of the cleaning roller, while still providing protection against hair migration into the roller core.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 7A is an end view of a roller.
FIG. 7B is an end view of a roller.
FIG. 7C is an end view of a roller.
FIG. 7D is an end view of a roller.
FIG. 7E is an end view of a roller.
FIG. 7F is an end view of a roller.

DETAILED DESCRIPTION

In certain robotic vacuum cleaners, a cleaning roller can be used to pick up debris. The cleaning roller can be driven at a drive end or gearbox side. During operation, a shell of the cleaning roller can become pinched between the floor and a bushing on the bearing end of the cleaning roller. Such pinching can cause successive episodes of decreased and then increased rotational speed of the cleaning roller at the bearing end. The inventors have recognized, among other things, that it may be possible to reduce or eliminate these fluctuations in rotational speed at the bearing end, such as by providing a bushing having a reduced cross section, such as to provide additional compliance in the bearing end of the cleaning roller, while still providing protection against hair migration into the roller core.

Figure 1A:
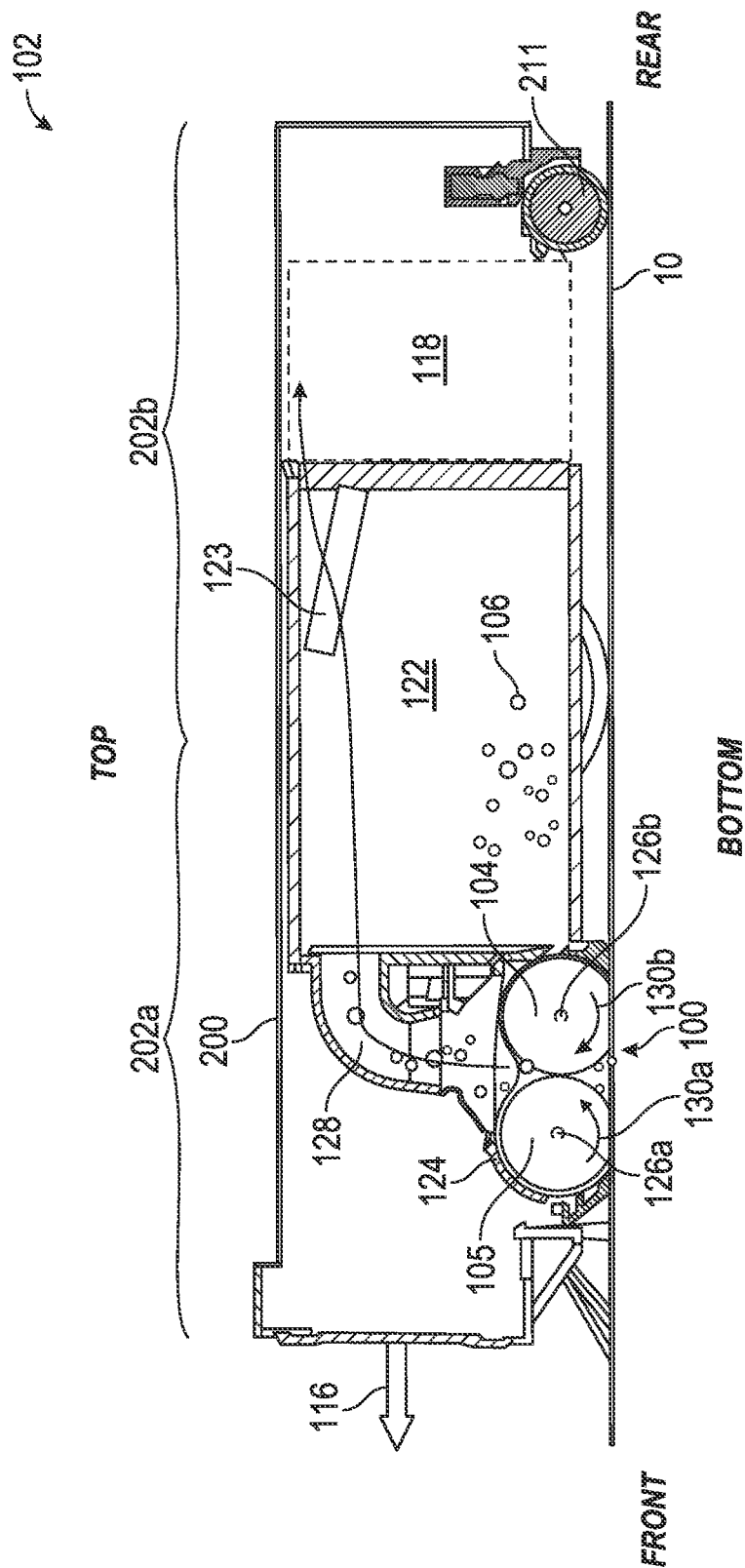
FIG. 1A is a cross-sectional side view, across indicators 1A-1A of FIG. 2A, of a cleaning robot and the cleaning head of FIG. 1B during the cleaning operation.
Figure 1B:
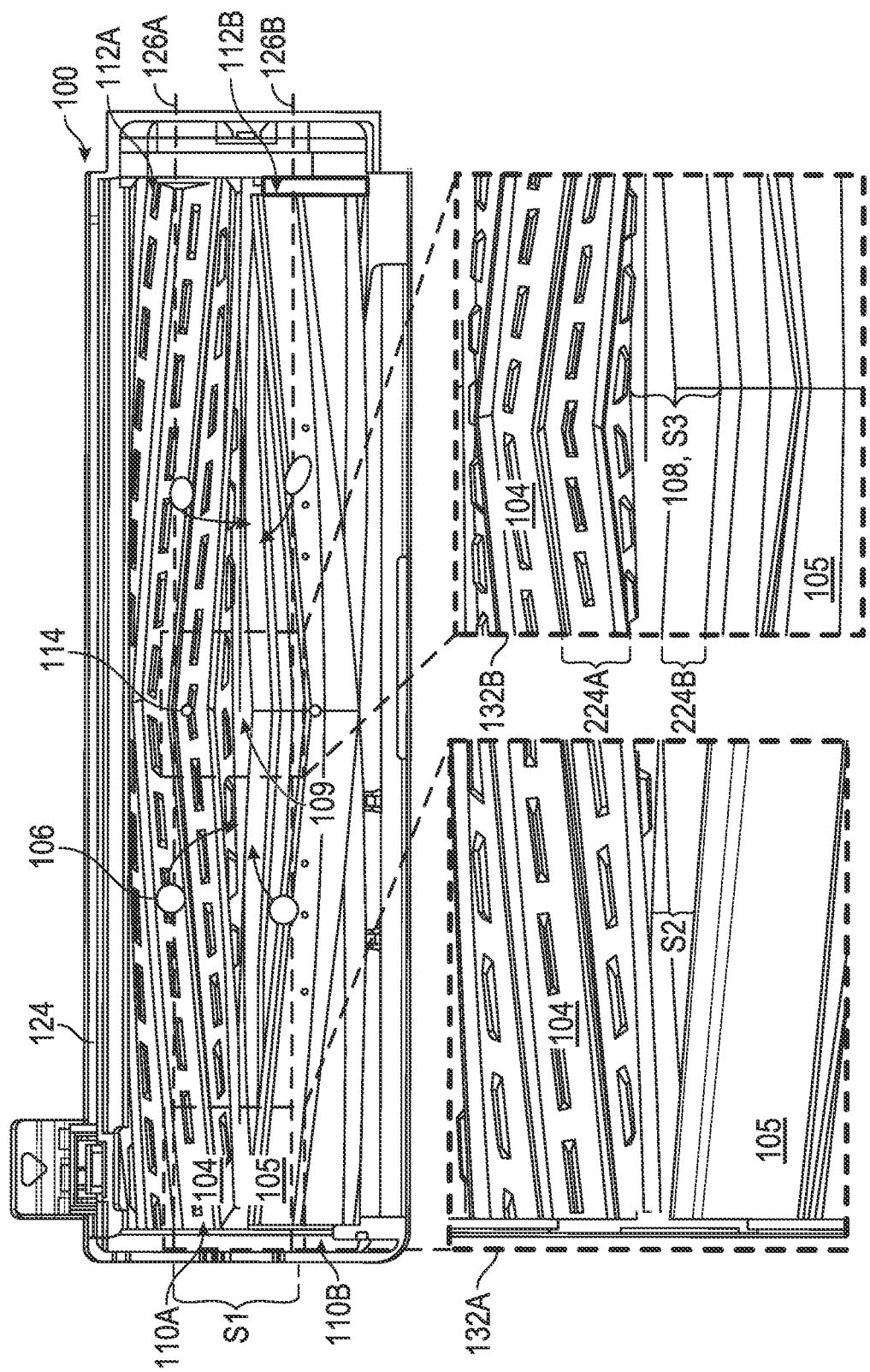
FIG. 1B is a bottom view of a portion of a cleaning head during a cleaning operation of a cleaning robot.

Referring to FIGS. 1A and 1B, a cleaning head 100 for a cleaning robot 102 can include cleaning rollers 104 and 105 that can be positioned to engage debris 106 on a floor surface 10. FIG. 1B depicts the cleaning head 100 during a cleaning operation, with the cleaning head 100 isolated from the cleaning robot 102 to which the cleaning head 100 is mounted. The cleaning rollers 104 and 105 can be different from one another, as described in further detail throughout this specification. The rear cleaning roller 104 is positioned rearward in the cleaning head 100 of the forward cleaning roller 105. The rear cleaning roller 104 can include a solid core. The forward cleaning roller 105 can include a non-solid core. Though the cleaning rollers 104 and 105 are referred to as the "forward cleaning roller 105" and the "rear cleaning roller 104", respectively, the positions of the cleaning rollers 104 and 105 can be switched such that the rear cleaning roller 104 is positioned forward of the forward cleaning roller 105 in the cleaning head 100.

The cleaning robot 102 moves about the floor surface 10 while ingesting the debris 106 from the floor surface 10. FIG. 1A depicts the cleaning robot 102, with the cleaning head 100 mounted to the cleaning robot 102, as the cleaning robot 102 traverses the floor surface 10 and rotates the cleaning rollers 104 and 105 to ingest the debris 106 from the floor surface 10 during the cleaning operation. During the cleaning operation, the cleaning rollers 104 and 105 can be rotated to lift the debris 106 from the floor surface 10 into the cleaning robot 102. Outer surfaces of the cleaning rollers 104 and 105 can engage the debris 106 and agitate the debris 106. The rotation of the cleaning rollers 104 105 can facilitate movement of the debris 106 toward an interior of the cleaning robot 102. For example, the rear cleaning roller 104 engages the floor surface 10 more firmly during cleaning than the forward cleaning roller 105. The forward cleaning roller 105 engages the floor surface more lightly than rear cleaning roller 104. The rear cleaning roller 104 can be more durable than the forward cleaning roller 105 and prevents debris from passing under the cleaning head 100 without being extracted from the cleaning surface 10. The forward cleaning roller 105 lightly agitates the debris so that the cleaning head 100 can extract the debris from the cleaning surface.

For example, as described herein, the cleaning rollers 104 and 105 are elastomeric rollers featuring a pattern of chevron-shaped vanes 224a and 224b (shown in FIG. 1B) distributed along an exterior surface of the cleaning rollers 104 and 105, respectively. The vanes 224a and 224b of at least one of the cleaning rollers 104 and 105, e.g., the rear cleaning roller 104, make contact with the floor surface 10 along the length of the cleaning rollers 104 and 105 and experience a consistently applied friction force during rotation that is not present with brushes having pliable bristles. Furthermore, like cleaning rollers having distinct bristles extending radially from a shaft, the cleaning rollers 104 and 105 have vanes 224a, 224b that extend radially outward. The vanes 224a and 224b, however, also extend continuously along the outer surface of the cleaning rollers 104 and 105, respectively, in longitudinal directions. The vanes 224a and 224b also extend along circumferential directions along the outer surface of the cleaning rollers 104 and 105, thereby defining V-shaped paths along the outer surface of the cleaning rollers 104 and 105, respectively, as described herein. Other suitable configurations, however, are also contemplated. For example, at least one of the rear and front cleaning rollers 104 and 105 may include bristles and/or elongated pliable flaps for agitating the floor surface in addition or as an alternative to the vanes 224a, 224b. The cleaning rollers 104 and 105 can have different configurations of the outer surfaces (e.g., as described in FIGS. 7A-7E, below). For example, the rear cleaning roller 104 includes fewer vanes than forward cleaning roller 105.

As shown in FIG. 1B, a separation 108 and an air gap 109 are defined between the rear cleaning roller 104 and the forward cleaning roller 105. The separation 108 and the air gap 109 both extend from a first outer end portion 110a of the rear cleaning roller 104 to a second outer end portion 112a of the rear cleaning roller 104. The separation 108 corresponds a distance between the cleaning rollers 104 and 105 absent the vanes on the cleaning rollers 104 and 105, while the air gap 109 corresponds to the distance between the cleaning rollers 104 and 105 including the vanes on the cleaning rollers 104 and 105. The air gap 109 is sized to accommodate debris 106 moved by the cleaning rollers 104 and 105 as the cleaning rollers 104 and 105 rotate and to enable airflow to be drawn into the cleaning robot 102 and change in width as the cleaning rollers 104 and 105 rotate. While the air gap 109 can vary in width during rotation of the cleaning rollers 104 and 105, the separation 108 has a constant width during rotation of the cleaning rollers 104 and 105. The separation 108 facilitates movement of the debris 106 caused by the cleaning rollers 104 and 105 upward toward the interior of the robot 102 so that the debris can be ingested by the robot 102. The separation 108 increases in size toward a center 114 of a length L1 of the rear cleaning roller 104, e.g., a center of the cleaning roller 114a along a longitudinal axis 126a of the cleaning roller 114a. The separation 108 decreases in width toward the end portions 110a, 112a of the rear cleaning roller 104. Such a configuration of the separation 108 can improve debris pickup capabilities of the cleaning rollers 104 and 105 while reducing likelihood that filament debris picked up by the cleaning rollers 104 and 105 impedes operations of the cleaning rollers 104 and 105.

Examples of Cleaning Robots

Figure 2A:
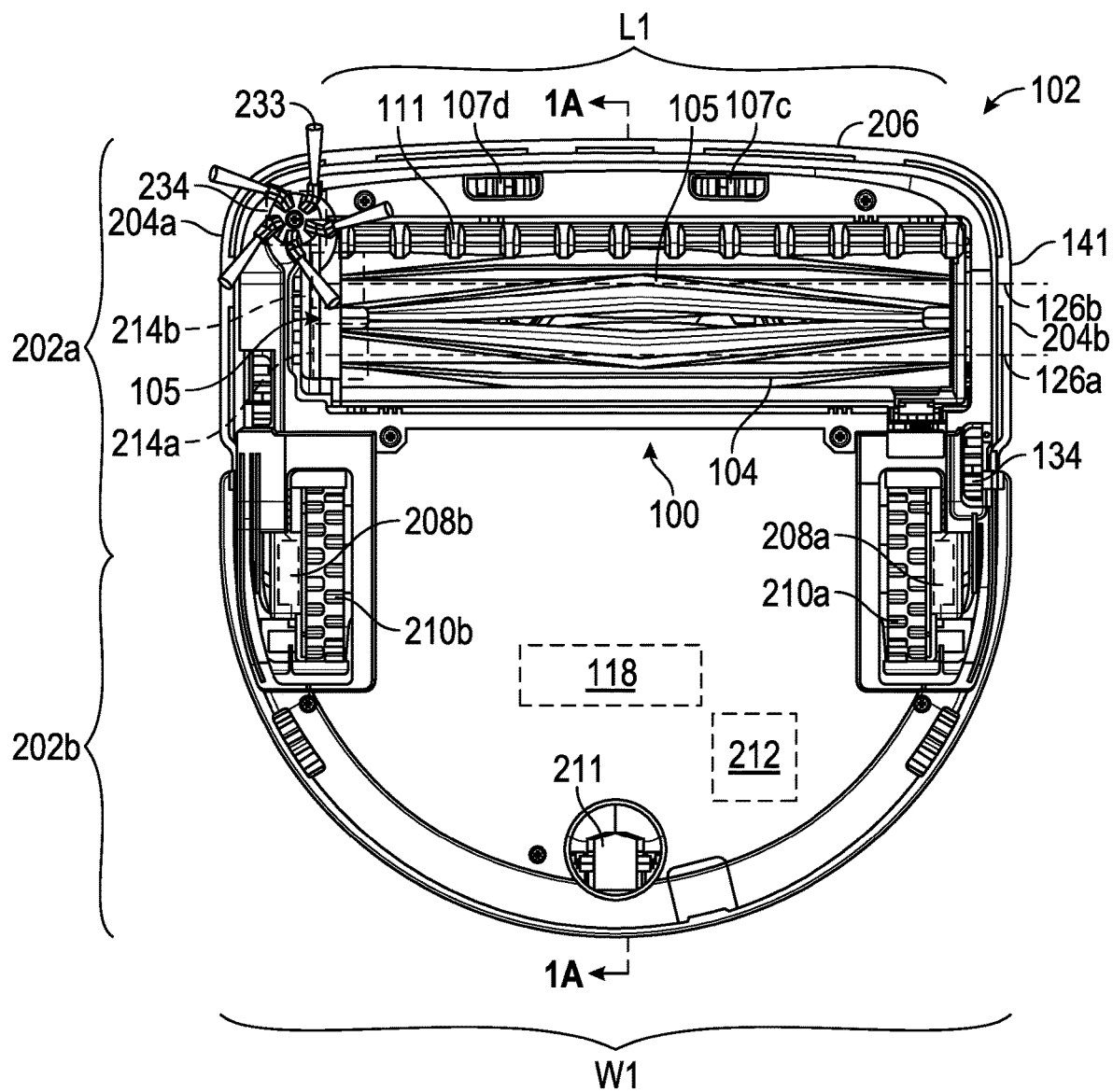
FIG. 2A is a bottom view of the cleaning robot of FIG. 1A.

The cleaning robot 102 can be an autonomous cleaning robot that autonomously traverses the floor surface 10 while ingesting the debris 106 from different parts of the floor surface 10. As depicted in FIGS. 1A and 2A, the robot 102 includes a body 200 movable across the floor surface 10. The body 200 can include multiple connected structures to which movable components of the cleaning robot 102 are mounted. The connected structures include, for example, an outer housing to cover internal components of the cleaning robot 102, a chassis to which drive wheels 210a and 210b and the cleaning rollers 104 and 105 are mounted, a bumper mounted to the outer housing, etc. As shown in FIG. 2A, the body 200 includes a front portion 202a that has a substantially rectangular shape and a rear portion 202b that has a substantially semicircular shape. The front portion 202a is, for example, a front one-third to front one-half of the cleaning robot 102, and the rear portion 202b is a rear one-half to two-thirds of the cleaning robot 102. The front portion 202a includes, for example, two lateral sides 204a and 204b that are substantially perpendicular to a front side 206 of the front portion 202a.

As shown in FIG. 2A, the robot 102 includes a drive system including actuators 208a and 208b, e.g., motors, operable with drive wheels 210a and 210b. The actuators 208a and 208b are mounted in the body 200 and are operably connected to the drive wheels 210a and 210b, which are rotatably mounted to the body 200. The drive wheels 210a and 210b support the body 200 above the floor surface 10. The actuators 208a and 208b, when driven, rotate the drive wheels 210a and 210b to enable the robot 102 to autonomously move across the floor surface 10.

The robot 102 includes a controller 212 that operates the actuators 208a and 208b to autonomously navigate the robot 102 about the floor surface 10 during a cleaning operation. The actuators 208a and 208b are operable to drive the robot 102 in a forward drive direction 116 (shown in FIG. 1A) and to turn the robot 102. The robot 102 can include a caster wheel 211 that supports the body 200 above the floor surface 10. The caster wheel 211 can support the rear portion 202b of the body 200 above the floor surface 10, and the drive wheels 210a and 210b support the front portion 202a of the body 200 above the floor surface 10.

As shown in FIGS. 1A and 2A, a vacuum assembly 118 is carried within the body 200 of the robot 102, e.g., in the rear portion 202b of the body 200. The controller 212 operates the vacuum assembly 118 to generate an airflow 120 that flows through the air gap 109 near the cleaning rollers 104 and 105, through the body 200, and out of the body 200. The vacuum assembly 118 can include, for example, an impeller that generates the airflow 120 when rotated. The airflow 120 and the cleaning rollers 104 and 105, when rotated, cooperate to ingest debris 106 into the robot 102. A cleaning bin 122 mounted in the body 200 contains the debris 106 ingested by the robot 102, and a filter 123 in the body 200 separates the debris 106 from the airflow 120 before the airflow 120 enters the vacuum assembly 118 and is exhausted out of the body 200. In this regard, the debris 106 is captured in both the cleaning bin 122 and the filter 123 before the airflow 120 is exhausted from the body 200.

Figure 2B:
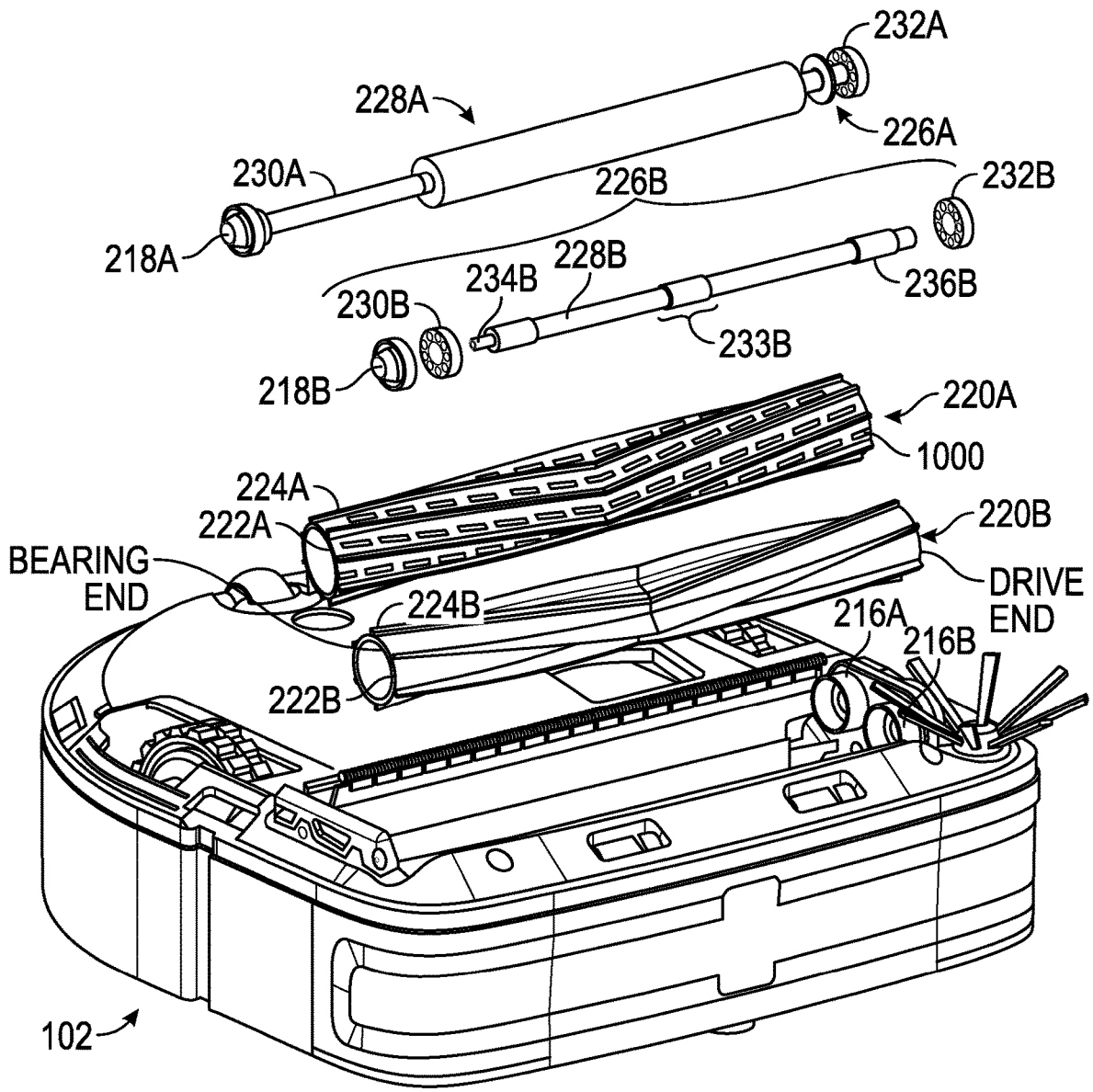
FIG. 2B is a side isometric exploded view of the cleaning robot of FIG. 2A.

As shown in FIGS. 1A and 2A, the cleaning head 100 and the cleaning rollers 104 and 105 are positioned in the front portion 202a of the body 200 between the lateral sides 204a and 204b. The cleaning rollers 104 and 105 are operably connected to actuators 214a and 214b, e.g., motors. The cleaning head 100 and the cleaning rollers 104 and 105 are positioned forward of the cleaning bin 122, which is positioned forward of the vacuum assembly 118. In FIGS. 2A, 2B, the substantially rectangular shape of the front portion 202a of the body 200 enables the cleaning rollers 104 and 105 to be longer than rollers for cleaning robots with, for example, a circularly shaped body.

The cleaning rollers 104 and 105 are mounted to a housing 124 of the cleaning head 100 and mounted, e.g., indirectly or directly, to the body 200 of the robot 102. In particular, the cleaning rollers 104 and 105 are mounted to an underside of the front portion 202a of the body 200 so that the cleaning rollers 104 and 105 engage debris 106 on the floor surface 10 during the cleaning operation when the underside faces the floor surface 10.

The housing 124 of the cleaning head 100 can be mounted to the body 200 of the robot 102. In this regard, the cleaning rollers 104 and 105 are also mounted to the body 200 of the robot 102, e.g., indirectly mounted to the body 200 through the housing 124. Alternatively or additionally, the cleaning head 100 is a removable assembly of the robot 102 in which the housing 124 with the cleaning rollers 104 and 105 mounted therein is removably mounted to the body 200 of the robot 102. The housing 124 and the cleaning rollers 104 and 105 are removable from the body 200 as a unit so that the cleaning head 100 is easily interchangeable with a replacement cleaning head.

The cleaning head 100 is moveable with respect to the body 200 of the robot 102. The cleaning head 100 moves to conform to undulations of the cleaning surface 10. One or more dampeners 107a, 107b, 107c, and 107d can be placed between the housing 124 of the cleaning head 100 and the body 200 of the robot 102. The dampeners 107a-107d can help to reduce noise that can occur when the cleaning head 100 moves with respect to the robot body 200. For example, four dampeners 107a-107d can be distributed near corners of the cleaning head. However, the cleaning head 100 can include more than or fewer than four dampeners 107a-107d. The dampeners 107a-107d can be affixed to the cleaning head 100 or to the robot body 200. The dampeners 107a-107d can be positioned at other locations between the robot body 200 and the cleaning head 100. The placement of the dampeners 107a-107d does not restrict the movement of the cleaning head 100 with respect to the body 200, but rather allows the cleaning head to freely move as needed to follow undulations of the cleaning surface 10. The dampeners 107a-107d include a soft, conformable material. For example, the dampeners 107a-107d can include felt pads.

Rather than being removably mounted to the body 200, the housing 124 of the cleaning head 100 need not be a component separate from the body 200, but rather, can correspond to an integral portion of the body 200 of the robot 102. The cleaning rollers 104 and 105 are mounted to the body 200 of the robot 102, e.g., directly mounted to the integral portion of the body 200. The cleaning rollers 104 and 105 are each independently removable from the housing 124 of the cleaning head 100 and/or from the body 200 of the robot 102 so that the cleaning rollers 104 and 105 can be easily cleaned or be replaced with replacement rollers. The cleaning rollers 104 and 105 can include collection wells for filament debris that can be easily accessed and cleaned by a user when the cleaning rollers 104 and 105 are dismounted from the housing 124.

The cleaning head 100 includes raking prows 111. The raking prows 111 are affixed to the housing 124 of the cleaning head 100. The raking prows 111 are configured to contact the cleaning surface 10 when the robot 102 is cleaning. The raking prows 111 are spaced to prevent large debris that cannot be ingested by the cleaning head 100 from passing beneath the cleaning head. The raking prows 111 can be curved over the rear cleaning roller 104. The curvature of the raking prows 111 enables the raking prows to enable the robot 102 to more easily traverse uneven surfaces. For example, the raking prows 111 can help enable the robot 102 to more easily climb onto a rug from another cleaning surface. The raking prows 111 can help prevent the cleaning head 100 from becoming stuck, ensnared, snagged, etc. on the cleaning surface 10, such as when the cleaning surface is uneven or has loose fibers.

The cleaning rollers 104 and 105 are rotatable relative to the housing 124 of the cleaning head 100 and relative to the body 200 of the robot 102. As shown in FIGS. 1A and 2A, the cleaning rollers 104 and 105 are rotatable about longitudinal axes 126a, 126b parallel to the floor surface 10. The axes 126a, 126b are parallel to one another and correspond to longitudinal axes of the cleaning rollers 104 and 105, respectively. In some cases, the axes 126a and 126b are perpendicular to the forward drive direction 116 of the robot 102. The center 114 of the rear cleaning roller 104 is positioned along the longitudinal axis 126a and corresponds to a midpoint of the length L1 of the rear cleaning roller 104. The center 114, in this regard, is positioned along the axis of rotation of the rear cleaning roller 104.

In the exploded view of the cleaning head 100 shown in FIG. 2B, the rear cleaning roller 104 includes a sheath 220a including a shell 222a and vanes 224a. The rear cleaning roller 104 also includes a support structure 226a and a shaft 228a. The sheath 220a can be a single molded piece formed from an elastomeric material. In this regard, the shell 222a and its corresponding vanes 224a are part of the single molded piece. The sheath 220a extends inward from its outer surface toward the shaft 228a and 228b such that the amount of material of the sheath 220a inhibits the sheath 220a from deflecting in response to contact with objects, e.g., the floor surface 10. The high surface friction of the sheath 220a enables the sheath 220a to engage the debris 106 and guide the debris 106 toward the interior of the cleaning robot 102, e.g., toward an air conduit 128 within the cleaning robot 102.

The shafts 228a and, in some cases, the support structure 226a are operably connected to the actuators 214a (shown schematically in FIG. 2A) when the rollers 104 are mounted to the body 200 of the robot 102. When the rear cleaning roller 104 is mounted to the body 200, mounting device 216a on the second end portion 232a of the shaft 228a couples the shaft 228a to the actuator 214a. The first end portion 230a of the shaft 228a is rotatably mounted to mounting device 218a, on the housing 124 of the cleaning head 100 or the body 200 of the robot 102. The mounting device 218a is fixed relative to the housing 124 or the body 200. Portions of the support structure 226a can cooperate with the shaft 228a such as to rotationally couple the rear cleaning roller 104 to the actuator 214a and to rotatably mount the rear cleaning roller 104 to the mounting device 218a.

For the forward cleaning roller 105, the shell 222b and its corresponding vanes 224b can be part of the single molded piece. The shell 222b is radially supported by the support structure 226b at multiple discrete locations along the length of the forward cleaning roller 105 and is unsupported between the multiple discrete locations. The shell 222b can be supported at a central portion 233b of the core 228b and by the first support member 230b and the second support member 232b. The first support member 230b and the second support member 232b are members having circular outer perimeters that contact encircling segments of an inner surface of the sheath 220b. The support members 230b and 232b thereby radially or transversely support the sheath 220b, e.g., inhibit deflection of the sheath 220b toward the longitudinal axis 126b (shown in FIG. 1B) in response to forces transverse to the longitudinal axis 126b. Where supported by the support members 230b and 232b or the central portion 233b of the core 228b, the sheath 220b is inhibited from deflecting radially inward, e.g., in response to contact with objects such as the floor surface 10 or debris collected from the floor surface 10. Furthermore, the support members 230b and 232b and the central portion 233b of the core 228b maintain outer circular shapes of the shell 222b.

Between the support member 232b and the central portion 233b of the core 228b, the sheath 220b can be unsupported. For example, the support structure 226b does not contact the sheath 220b between the support members 230b and 232b and the central portion 233b of the core 228b. The air gaps 242b and 244b can span these unsupported portions and provide space for the sheath 220b to deflect radially inwardly, e.g., to deflect toward the longitudinal axis 126b.

The forward cleaning roller 105 further includes rod member 234b rotatably coupled to mounting device or bushing 218b and rotationally coupled to the support structure 226b. The mounting device or bushing 218b is mounted to the robot body 200, the cleaning head housing 124, or both so that the mounting device or bushing 218b is rotationally fixed to the robot body 200, the cleaning head housing 124, or both. In this regard, the rod member 234b and the core 228b rotate relative to the mounting device or bushing 218b as the forward cleaning roller 105 is driven to rotate.

The rod member 234b is an insert-molded component separate from the support structure 226b. For example, the rod member 234b is formed from metal and is rotatably coupled to the mounting device or bushing 218b, which in turn is rotationally fixed to the body 200 of the robot 102 and the housing 124 of the cleaning head 100. Alternatively, the rod member 234b is integrally formed with the support structure 226b.

The forward cleaning roller 105 further includes elongate portion 236b operably connected to an actuator 214b (shown schematically in FIG. 2A) of the robot 102 when the forward cleaning roller 105 is mounted to the body 200 of the robot 102 or the housing 124 of the cleaning head 100. The elongate portion 236b is rotationally fixed to engagement portions (not shown) of the actuation system of the robot 102, thereby rotationally coupling the forward cleaning roller 105 to the actuator 214. The elongate portion 236b also rotatably mounts the forward cleaning roller 105 to the body of the robot 102 and the housing 124 of the cleaning head 100 such that the forward cleaning roller 105 rotates relative to the body 200 and the housing 124 during the cleaning operation.

FIGS. 3-6 illustrate a bushing 218b, a shell 222b, and a cleaning roller 105. A bushing such as the bushing 218b can be included in the cleaning roller 105, the cleaning roller 104, or both. The bushing 218b can include a cross section normal to an axis of rotation of the cleaning roller 105 that provides for additional compliance (or flexibility) at the bearing end of the cleaning roller 105 or cleaning roller 104. In a plane perpendicular to an axis of rotation of the cleaning roller, the bushing 218b can include a cross-sectional area that is smaller than a cross sectional area of the shell at the bearing end of the cleaning roller 105. The cross-sectional area of the bushing can be less than 85%, 90%, or 95% of the cross-sectional area of the shell at the bearing end of the cleaning roller.

Figure 3:
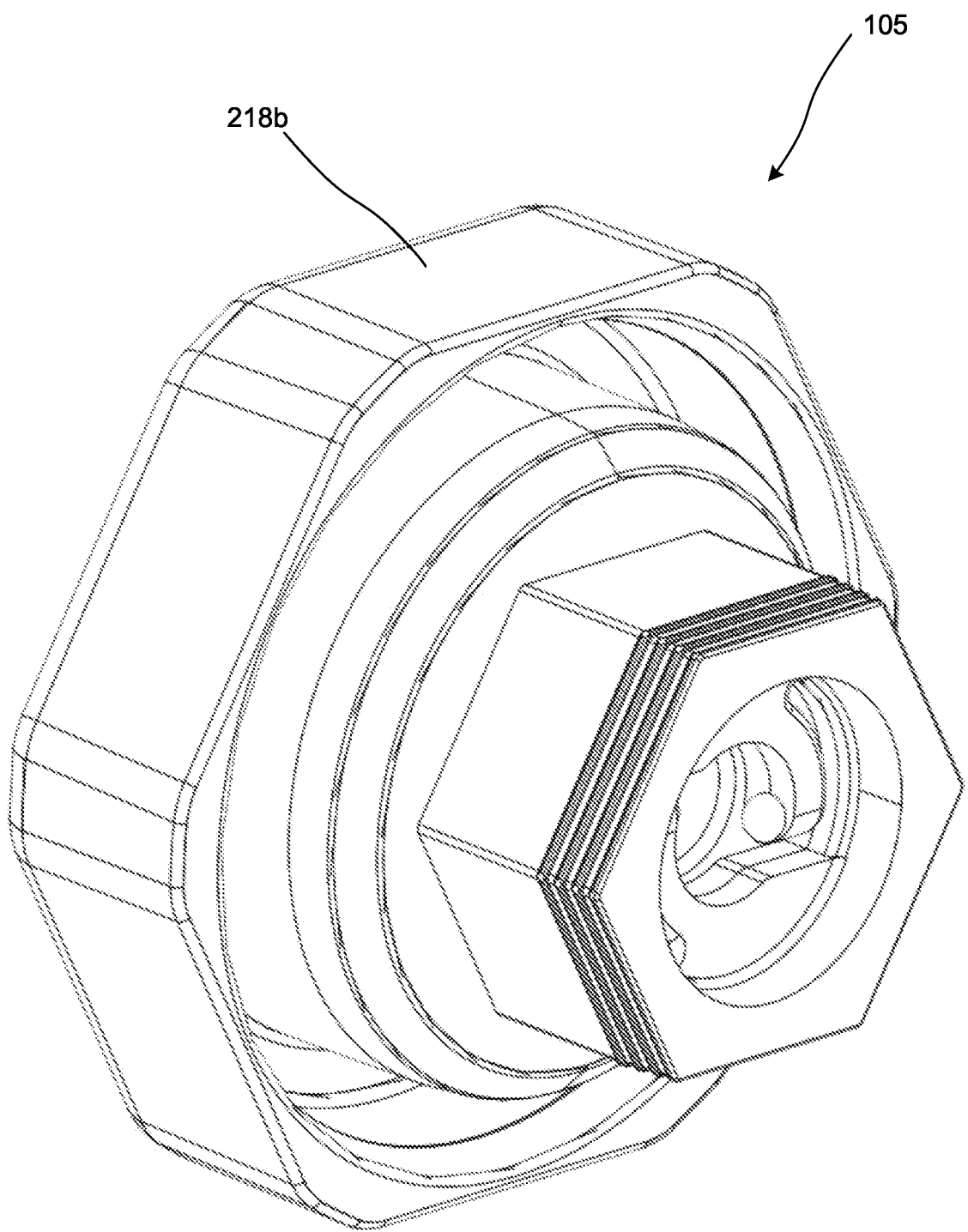
FIG. 3 is a front isometric view of a bushing.
Figure 4:
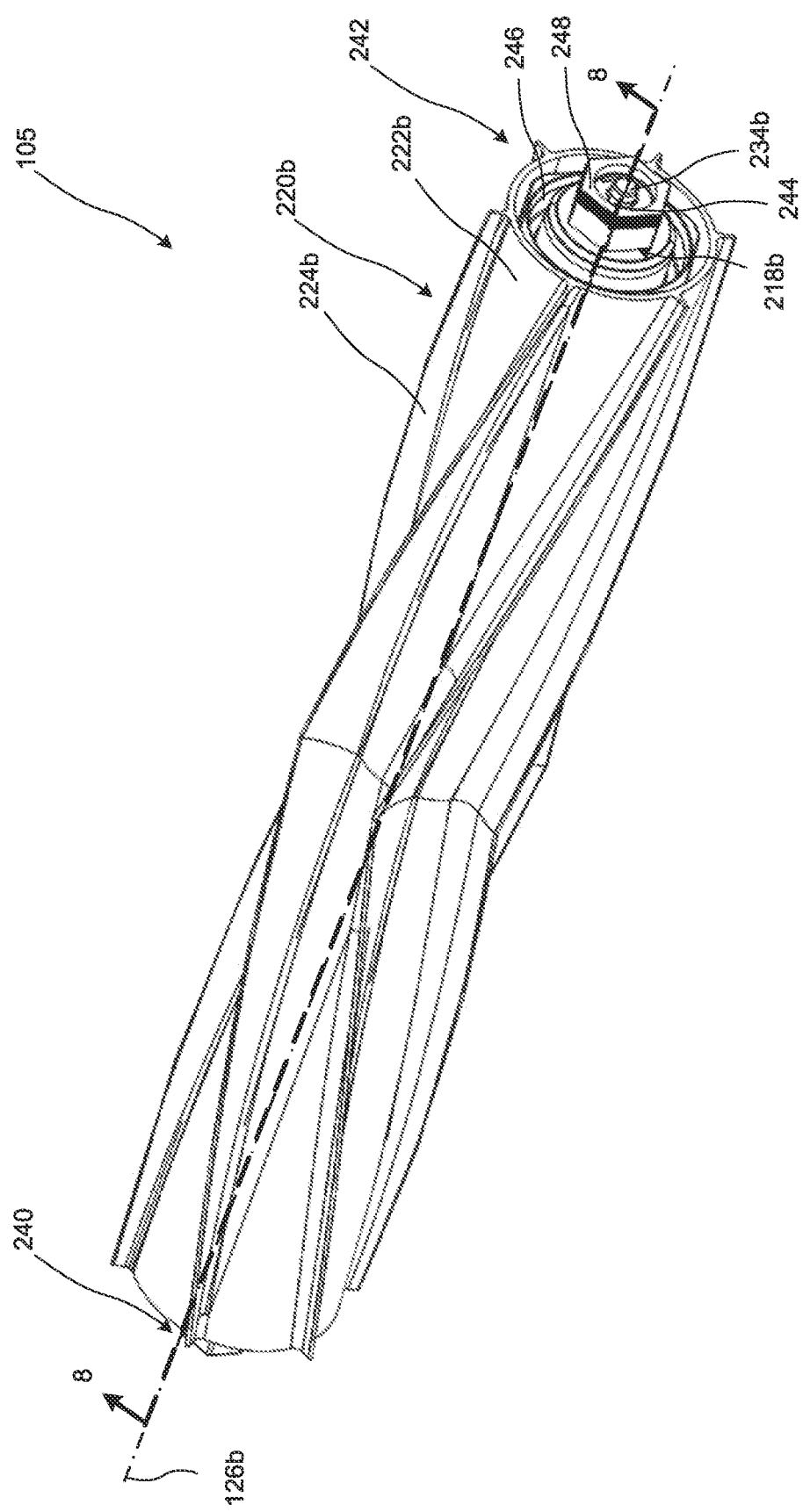
FIG. 4 is a front isometric view of a cleaning roller.
Figure 5:
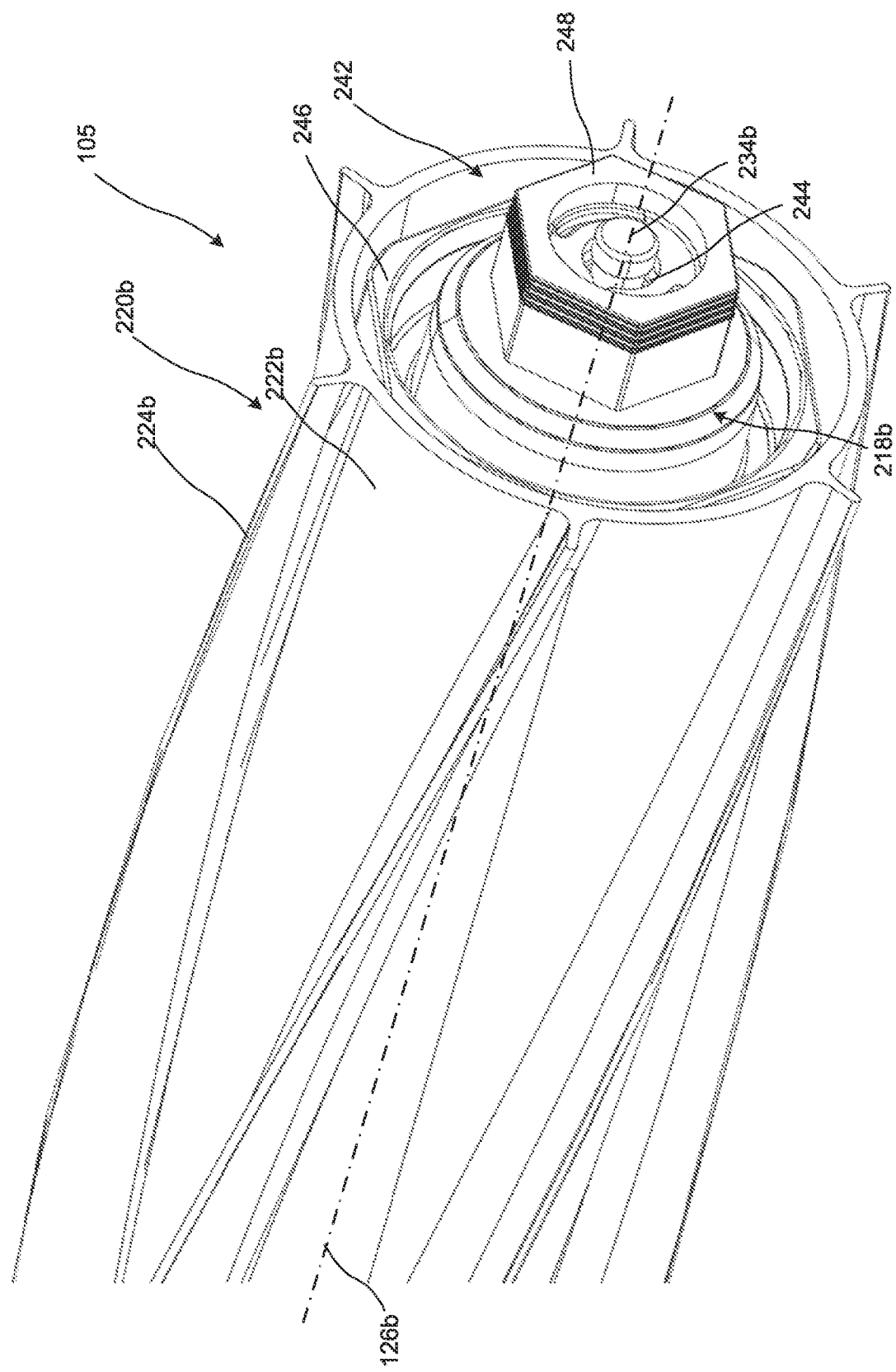
FIG. 5 is a front isometric view of a portion of a cleaning roller.

More specifically, FIGS. 3-5 shows that the drive shaft 228b can extend along the drive axis 126b and can be rotatable about the drive axis 126b. The drive shaft 228b can include a driven end 240 and an undriven opposite bushing end 242. The driven end 240 can be driven by a motor (such as the actuator 214b) and the undriven opposite bushing end 242 can be generally supported by a body of the robot. The sheath 220b can include the shell 222b and vanes 224b, which can be engageable with a work surface, such as the floor surface 10, such as discussed above. The sheath 220b can be supported by the drive shaft 228b and the sheath 220b can be rotatable with the drive shaft 228b.

The bushing 218b can be an assembly of components including a bushing 244, which can be a sleeve, journal bearing, ball bearing, or other bearing or bushing type configured to support relatively low friction rotation. The bushing 244 can be located about the bushing end 242 of the drive shaft 228b and the bushing 244 can be connected to the rod member 234b of the shaft 228b. The bushing 218b can further include a bushing shroud 246. The bushing shroud 246 can be connected to the bushing 244 and the shroud 246 can be connected to a body of the robot. The sheath 220b and the drive shaft 228b can be together rotatable with respect to the bushing 244 and the bushing shroud 246. During operation, the bushing shroud 246 can help limit axial movement of debris, such as hair, into the sheath 220b toward the driven end 240 of the shaft 228, which can help prevent such debris from increasing friction between the shaft 228 and the bushing 244.

As shown in FIGS. 4-5, the bushing 218b can also include a bushing shroud mount 248. The shroud mount 248 can extend axially away from the driven end and can support the bushing 244 therein such that the rod member 234b extends into (and optionally) through the shroud mount 248. In some examples, the shroud mount 248 can have an outer diameter or dimension smaller than that of the shroud 246. In some examples, the shroud 246 can be located axially within the shell 222b of the sheath 220b and the shroud mount 248 can extend axially beyond the bushing end 242 of the sheath 220b. The shroud mount 248 can be used to secure the bushing assembly 118 and therefore the roller 105 to the body 200 of the robot 102, such as discussed further below in FIG. 8.

Figure 6:
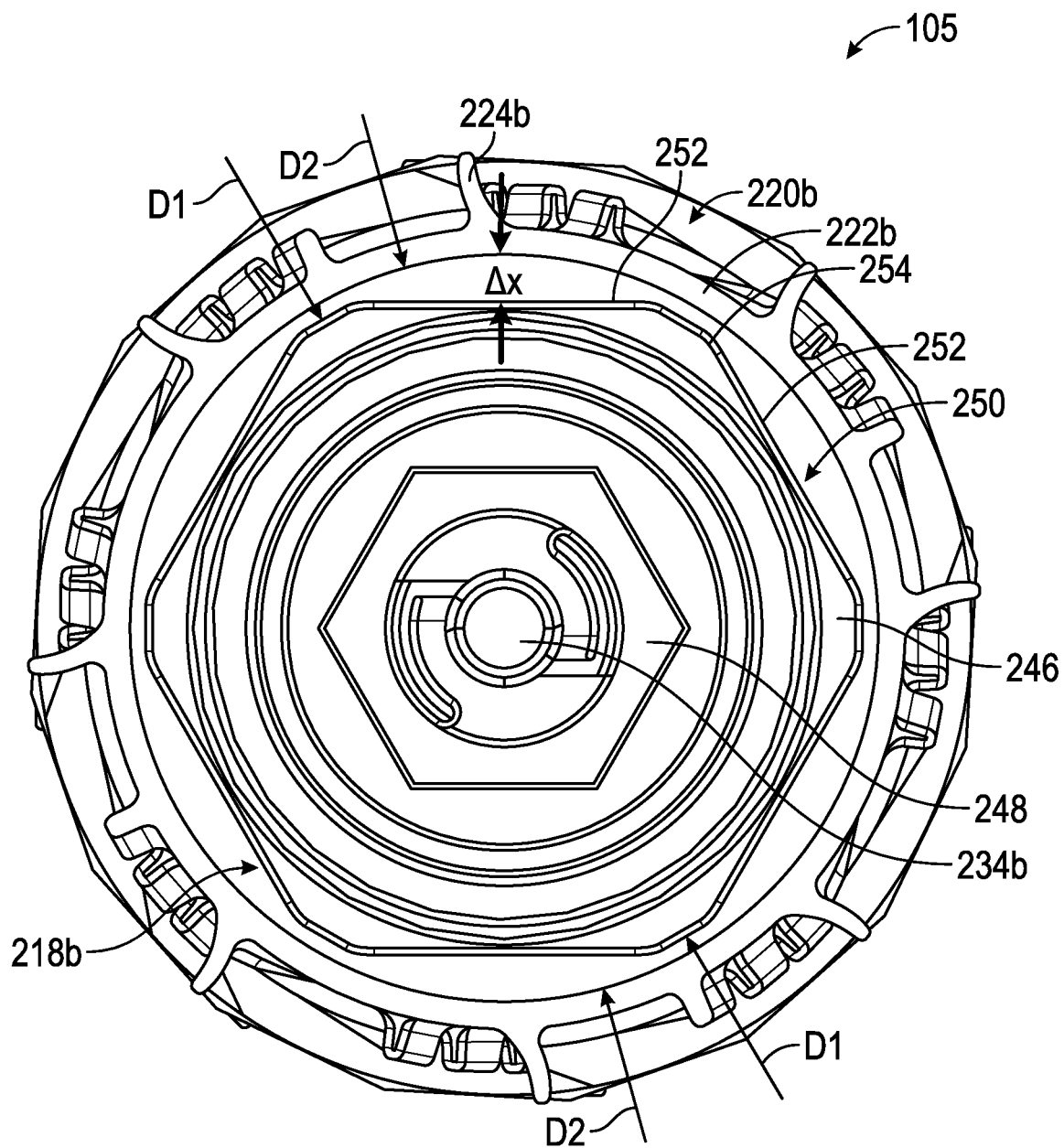
FIG. 6 is an end view of the cleaning roller of FIGS. 4 and 5.

As shown in FIG. 6, the shroud 246 can define a periphery 250. The periphery 250 can be an outer portion, outer perimeter, outer edge(s), or outer surface(s) of the shroud 246. As discussed below with respect to FIGS. 7A-7F, the periphery 250 of the shroud 246 can take a variety of geometric shapes.

FIG. 6 also shows that the bushing shroud 246 can include recessed periphery portions 252 and outer periphery portions 254. The recessed portions can include flats or curved portions connected to the outer portions 254, which can be corners or rounded corners connected to the recessed periphery portions 252. Together, the periphery portions 252 and the outer periphery portions 254 can define the periphery 250 of the bushing shroud 246.

For example, the outer portion(s) 254 can define a first radius and a first radius of curvature and the recessed portion(s) 252 can define a second radius and a second radius of curvature. In some examples, the second radius of curvature can be significantly larger than the first radius of curvature. In some examples, the curvature of the outer portions 254 can be in a direction opposite the curvature of the recessed portions 252, such that the curvature of the outer portions 254 is convex and the curvature of the recessed portions 252 is concave from the same perspective. Or, the recessed portion 254 can define a concavity. That is, the first radius of curvature of the outer portions 254 can have a center of its radius of curvature that is located radially inward of the outer periphery 250 and the second radius of curvature of the recessed portions 252 can have a center of its radius of curvature that is located radially outward of the periphery 250. In other examples, the curvatures of the recessed portions 252 and the outer portions 254 can be in the same direction. In some examples, a radially outer portion of the periphery 250 can terminate radially inward of the shell 222b and the recessed portion 252 of the periphery can define a nadir of the periphery 250 that is radially inward of the radially outer portion of the periphery 250.

At least a portion of the recessed portions 252 can terminate radially inward of one or more of the outer portions 254 such that the recessed portions 252 can be configured to allow the sheath 220b to deflect radially inward of the outer portions 254. The recessed portions 252 of the periphery 250 can define the clearance (such as the gap Δx) such as to permit a portion (such as the shell 222b) of the sheath 220b to deflect radially inward when the sheath (220b) contacts the working surface. In some examples, the gap Δx can permit a portion of the sheath 220b to deflect radially inward of an outer diameter D1 of the outer portions 254. The outer diameter D1 can be smaller than a diameter D2 of the sheath 220b.

The gap Δx between recessed portions 252 of the bushing 218b and the shell 222b can accommodate the deflection of the shell 222b, such as to help reduce or avoid pinching of the shell 222b between the floor and the bushing 218b during operation of the cleaning roller 105. The gap between an outer perimeter of the bushing 218b and an inner perimeter of the shell 222b can be in a range from 1.5 mm to 2.5 mm, 1.5 mm to 3.5 mm, 1.5 mm to 4.5 mm, 1.0 mm to 2.5 mm, 1.0 mm to 3.5 mm, 1.0 mm to 4.5 mm, for example. The cross-sectional shape of the bushing can be a circle, oval, polygon, a regular polygon, or a hexagon. In an example, a bushing similar to the bushing 218b can be located at the drive end in addition to the bearing end of the cleaning roller.

During operation, when a roller (such as a roller without the recessed portions 252) is rotating, and when the roller engages a working surface, such as the floor surface 10 of FIG. 1A, the shell of the sheath can deflect radially inwardly. Because a bushing shroud is supported by the robot body, the bushing shroud need not rotate with the sheath. In some instances, the sheath can become temporarily pinched or trapped between the shroud and the working surface, which can cause the roller to wind-up and then release (lash). This can result in episodes of decreased and then increased rotational speed, which can lead to undesired wear on various components of the robot (such as the roller and its motor) and can create undesirable noise.

The configuration of the roller 105 can help to address these issues. One of the recessed portions 252 can be oriented toward the work surface (such as the floor surface 10), which can allow the shell 222b to deflect radially inward (toward the axis 126b) by a distance of up to the gap Δx. Because the shell 222b can deflect inward, it is less likely to become trapped or pinched between the working surface and the shroud 246. This can help to allow the roller 105 to rotate more easily with respect to the work surface and a body of the robot, such as for helping to reduce wind-up and lash of the roller 105, which in turn can help to reduce wear on the roller 105 and actuator 208.

Exemplary Bushing Cross Sections

As shown in FIGS. 7A-7E, the outer circles below correspond to shell, inner shape corresponds to bushing cross-section.

FIGS. 7A-7E show that a roller 705 can include a sheath 720 and a bushing shroud 746, which can include a recessed portion 754 of a periphery 750 of the bushing shroud 746.

As shown in FIG. 7A, the periphery 750 of the shroud 746 of the roller 705A can have a geometric shape of a hexagonal prism or a hexagonal prism with rounded portions (as shown in FIG. 6).

As shown in FIG. 7B, the periphery 750 of the shroud 746 of the roller 705B can have a geometric shape of a pentagonal prism or a pentagonal prism with rounded portions.

As shown in FIG. 7C, the periphery 750 of the shroud 746 of the roller 705C can have a geometric shape of a rectangular cylinder or a rectangular cylinder with rounded portions.

As shown in FIG. 7D, the periphery 750 of the shroud 746 of the roller 705D can have a geometric shape of a cylinder.

As shown in FIG. 7E, the periphery 750 of the shroud 746 of the roller 705D can have a geometric shape of a cylinder with a recessed portion 752, which can include a flat portion or can have a different curvature. That is, the recessed portion 752 of the periphery can be defined by a chord of a circular projection outline defined by the outer portion. The recessed portions 752 of the shrouds 746 of the rollers 705A, 705B, 705C, and 705E can each include flat portions or can define a planar outer surface, but can be rounded or curved in other examples.

Once installed, the recessed portions 754 of the shrouds 746 of the rollers 705A, 705B, 705C, and 705E can be oriented toward a working surface. For example, as shown in FIG. 7E, the recessed portion 752 can be rotated to become oriented toward the working surface (or the floor surface 10). Then, when a force, such as the force F of FIG. 7F is applied to the sheath 720, the sheath 720 can deflect radially inward toward the recessed portion 752, where such inward deflection can help to avoid pinching of the sheath 720 between the floor surface 10 and the outer periphery 750, which, in turn, can help to reduce wind-up and lash of the roller 705 during operation.

Figure 8:
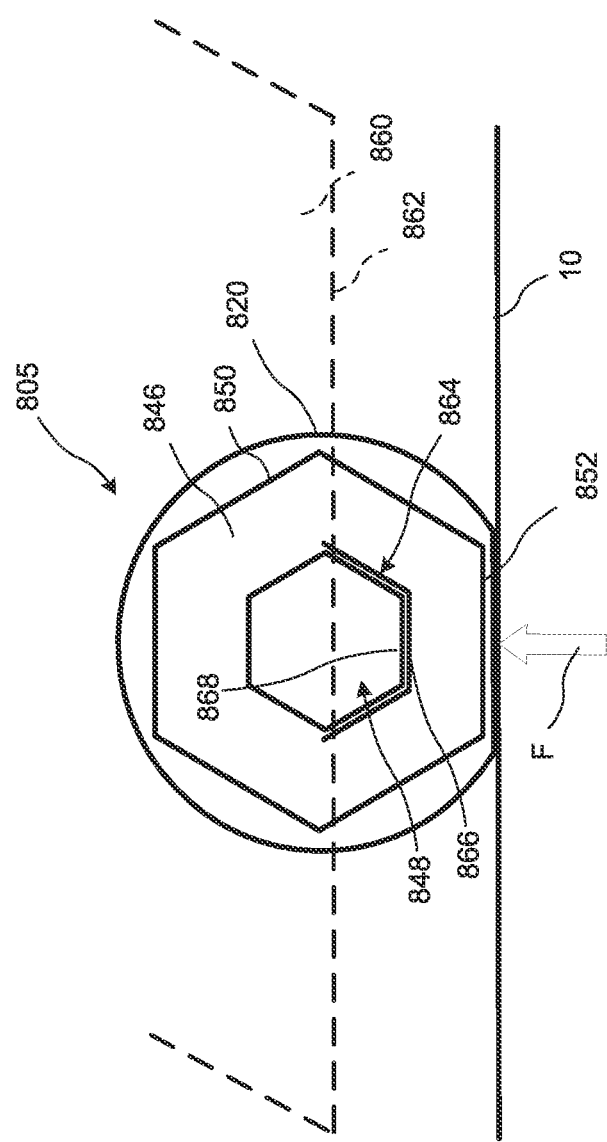
FIG. 8 is an end view of a roller.

FIG. 8 is an end view of a roller 805 and a body 860 of a mobile cleaning robot (such as the robot 102 discussed above). The body 860 can define a bottom surface 862. The roller 805 can include a sheath 820, a bushing shroud 846, and a shroud mount 848. The bushing shroud 846 can include an outer periphery 850 defining a recessed portion 852. The body 860 can include a bracket support 864. Also shown in FIG. 8 are a working surface 10 and force F.

The bushing shroud mount 848 can be a support of the roller 805 configured to support the bushing of the roller 805 via the body 860. The bracket support 864 can be connected to the bushing shroud 846 such that the sheath 820 is rotatable relative to the shroud 846 and the shroud mount

848. As shown in FIG. 8, the shroud mount 848 can be hexagonal, but it can have other shapes.

The bracket support 864 can be connected to the body 860 of a robot and can be configured to support the shroud mount 848 therein. The bracket support can include one or more additional supports, such as can be located above the shroud mount 848, such as for positioning the shroud mount, such as during service of the roller 805. The bracket support 864 can include a latch mechanism. The bracket support 864 can be shaped complementary to the shroud mount 848 such that the bracket support 864 can receive and engage multiple surfaces or faces.

For example, a bottom portion 866 of the bracket support 864 can engage a bottom portion 868 (e.g., face or surface) of the shroud mount 848, such as where the bottom portion 868 of the shroud mount 848 can be parallel with the recessed portion 852 and can be parallel with the bottom surface 862 of the body 860 (and therefore parallel to the floor surface 10). Because the bracket support 864 can be shaped complementary to the shroud mount 848 and because the bottom portion 868 can be parallel with the bottom surface 862, the recessed portion 852, and the floor surface 10, when the shroud mount 848 is mounted within the bracket support 864 the bracket support 864 can orient the recessed portion 852 in a desired position, such as a position in which the recessed portion 852 is parallel with the body 860 and the floor surface 10. The bracket support 864 can thereby help to ensure that the shroud 846 is properly oriented with respect to the floor surface 10 such as can help limit pinching of the sheath 820 between the floor surface 10 and the bushing shroud 846, which, in turn, can help limit wind-up and lash of the roller 805 during rotating operation of the roller 805.

In some examples, the bushing shroud 846 can include a plurality of recessed portions 852 and the bushing shroud mount 848 can includes a plurality of flats 868, such as where each flat 868 of the shroud mount 848 is parallel with one recessed portion 852. Then, any of the flats 868 can be engageable with the bottom surface 866 to orient one of the flat portions 868 and therefore a corresponding one of the recessed portions 852 of the periphery 850 toward the working surface 10, such as for helping to avoid incorrect user installations of the roller 805.

Figure 9:
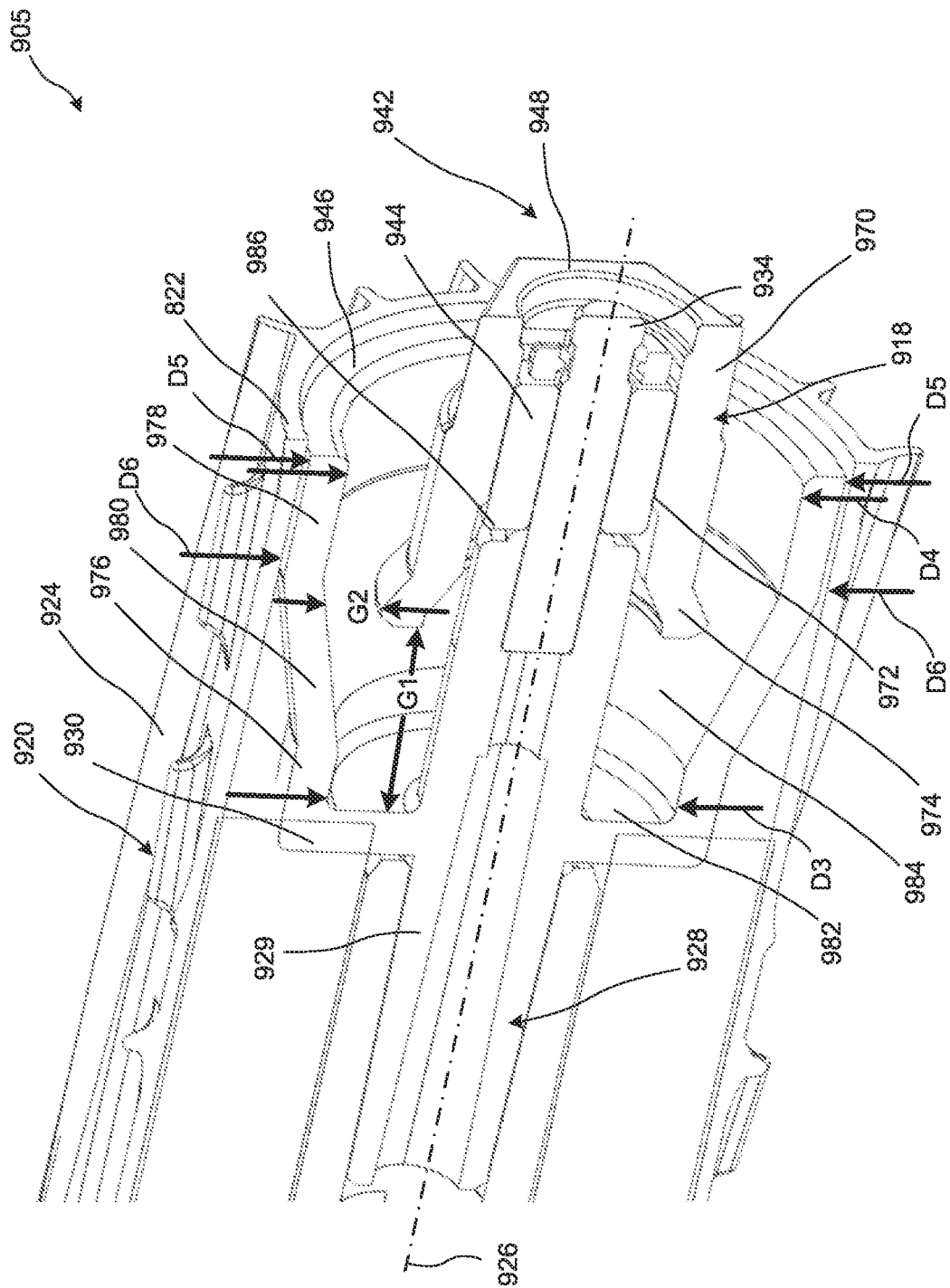
FIG. 9 is a cross-sectional isometric view of a portion of a roller assembly.

FIG. 9 is an exploded isometric view of a portion of a roller assembly 905. The roller assembly 905 can include a bushing or mounting device 918, a sheath 920 (including a shell 922 and vanes 924), a shaft, and a support 930. The shaft 928 can include a shaft carrier 929, a bearing portion or rod member 934, and a bearing end 942. The bushing assembly 918 can include a bushing 944 and a bushing mount 948. The mount 948 can include a support portion 970 defining a bore 972 therein and the mount 948 can include a flared portion 974. Also shown in FIG. 9 is a drive axis 926.

The roller 905 can be similar to those discussed above, however the roller can include a shroud extension 946 that can be connected to the shaft 928. More specifically, the support 930 can be connected to the shaft 928 axially inward (away from the bearing end 942) of the roller 905 and the support 930 can extend radially outward from the shaft 928. The bushing assembly 918 can be configured to be supported by a body of the robot. The support portion 970 and the bore 972 can be sized to receive and retain the bushing 944 therein. The bearing portion 934 (or rod) can extend from the shaft carrier 929 and can extend away from the driven portion of the shaft 928. The bushing 944 can be configured to receive the rod 934 therein to create a bearing for the roller 905. In some examples, the shaft 928 can engage or abut the bushing 944.

The shroud extension 946 can begin at the support 930 where a support portion 976 can extend substantially axially from the support 930. The shroud extension 946 can be therefore connected to the bushing portion of the shaft 928 and can extend longitudinally at least partially into the sheath 920 from a termination of the sheath 920. The shroud extension 946 can also be at least partially surround the bushing support 948. The support portion 976 of the shroud extension 946 can be connected to a collection portion 978 via a transition portion 980. The collection portion 978 can extend axially near an axial end of the shell 920 of the bearing end 942 of the roller 905. The transition portion 980 can be angled radially inward from the collection portion 978 to the support portion 976.

The collection portion 978 can have a diameter D5 that is slightly smaller than, slightly larger than, or the same as an inner diameter D6 of the shell 922. For example, the outer diameter D5 of the collection portion 978 can be between 1 millimeter (mm) smaller than the inner diameter D6 of the shell 922 and 1 mm larger than the inner diameter D6 (such that there is an interference between the collection portion 978 and the shell 922). In some examples, the outer diameter D5 of the collection portion 978 can be between 0.5 mm smaller than the inner diameter D6 of the shell 922 and 0.2 mm larger than the inner diameter D6 (such that there is an interference between the collection portion 978 and the shell 922).

The support portion 976 of the shroud extension 946 and the support 930 can together form a cap 982. The cap 982 can be sealed such as to help limit debris within the extension 946 from traveling axially beyond the cap 982 toward the driven portion of the shaft 928. The cap 982 can define a cap diameter D3 that is smaller than a diameter D4 of the collection portion 978.

The flared portion 974 of the support can extend from the bushing support portion 970 axially toward the driven end of the shaft 928 (away from the bushing end 942) and the flared portion 974 can extend radially outward as it extends axially away from the bushing end 942. The flared portion 974 can terminate prior to the cap 982 such that the flared portion 974 can at least partially define an axial gap G1 between the flared portion 974 and the cap 982. The flared portion 974 can also at least partially defines a radial gap G2 between the flared portion 974 and the transition portion 980 (or the connection portion 976 or the collection portion 978) of shroud extension 946. These components and the gaps of the shroud extension 946 can define a cavity 984 for collecting debris. The flared portion 974 can also help to make assembly of the bushing 918 and the shaft 928 easier and more time-efficient, while still providing a labyrinth seal for helping to limit the passage of hair and debris from outside the shroud extension 946, through the gap G2, the gap G1, into the flared portion, and then into a passage 986 between the bushing 944, the shaft carrier 929, and the support portion 970.

In operation of some examples, the shaft 928 can rotate with respect to the bearing assembly 918. Because the shroud extension 946 is connected to the shaft 928, the shroud extension 946 can rotate with the shaft 928 and can help to provide stiffness for the sheath 920 when the sheath engages a floor surface, which can help to limit wind-up and lash of the roller 905 during operation. During rotation of the roller 905, the collection portion 978 can receive debris and hair therein, which can collect in the cavity 984 of the shroud extension 946. Such collection can help to keep debris and hair away from the bushing 944.

It can be desirable to have the cavity 984 define as large of a volume as possible to collect as much debris as possible before the volume fills, which can help increase a required service interval of the roller 905. However, it is also desired to engage the sheath 920 with the shroud extension 946 as little as possible while still providing rigidity to help reduce lash. The transition portion 980 and smaller diameter D3 of the extension 946 can help to connect the collection portion 978 to the shaft 928 while helping to provide a balance between contact between the shroud extension 946 and the shell 920 to help reduce wind-up and lash of the roller 905 while also reducing or minimizing contact between the shroud extension 946 and the shell 920 so that the shell 920 can remain compliant for extracting debris during cleaning operations.

Figure 10B:
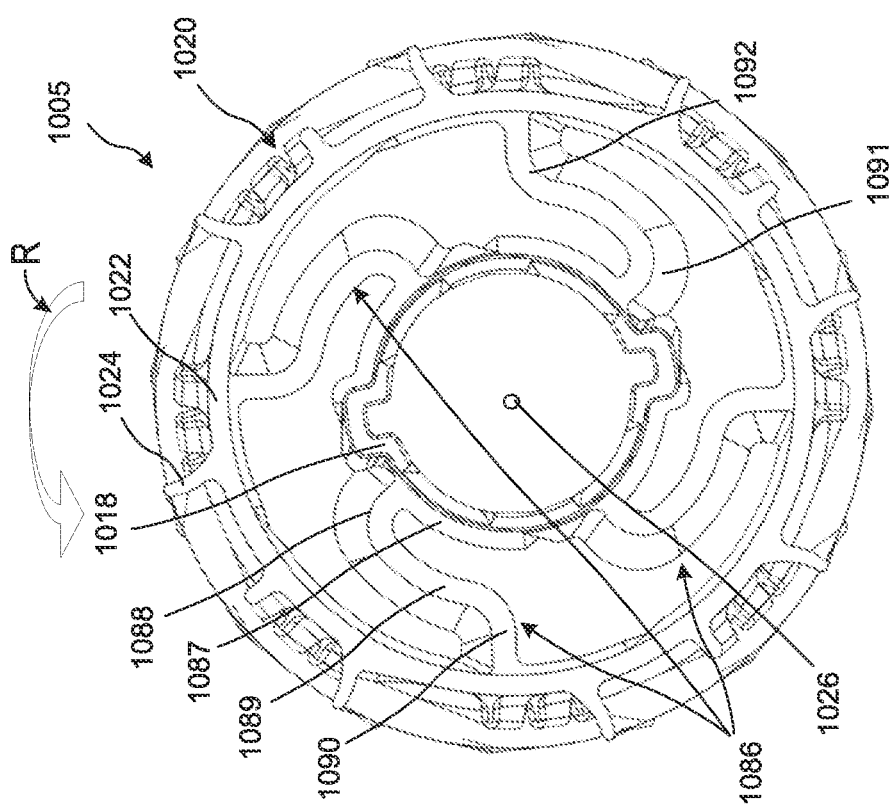
FIG. 10B is a cross-sectional end view of a roller.
Figure 10A:
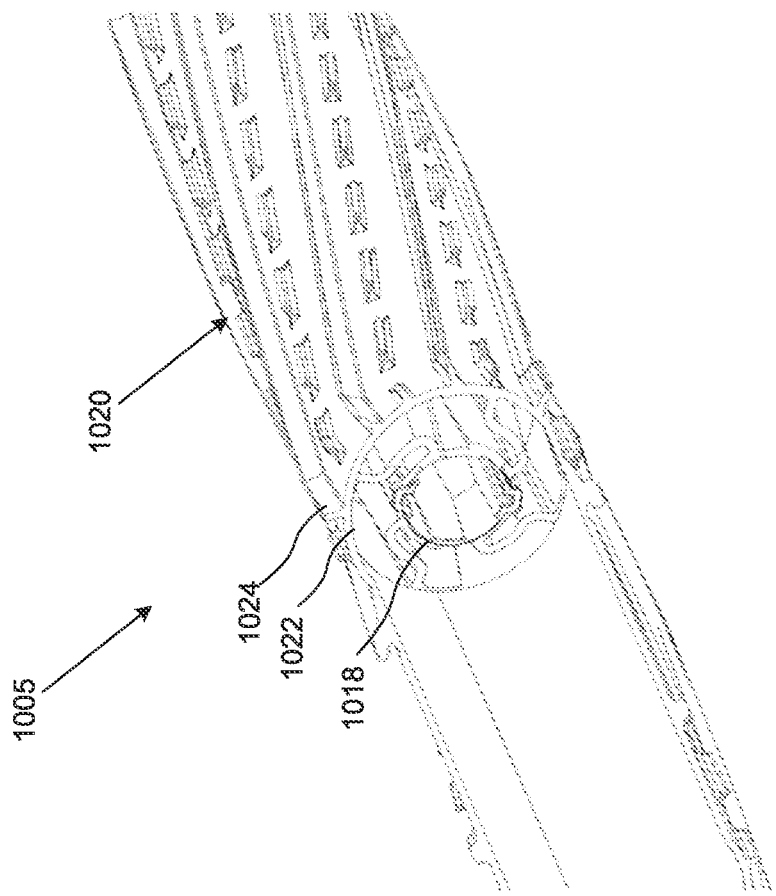
FIG. 10A is a partial cross-sectional isometric view of a portion of a roller.

FIG. 10A is a partial cross-sectional isometric view of a portion of a roller 1005. FIG. 10B is a cross-sectional end view of the roller 1005. FIGS. 10A and 10B are discussed below together.

The roller 1005 can include a shaft 1018 and a sheath 1020 including a shell 1022 and vanes 1024. The roller 1005 can also include a plurality of spokes 1086. Each spoke 1086 can include a shaft portion 1087, a radially inner portion 1088, a middle or medial portion 1089, and a radially outer portion 1090.

The roller 1005 can be similar to those discussed above however the spokes 1086 can be shaped or configured to absorb radial forces. Any of the rollers previously discussed herein can be modified to include such spokes.

The vanes 1024 can be spaced around a circumference of the shell, such that each vane 1024 can be connected to and can extend radially outward from the shell 1022. The spokes 1086 can be connected to and can extend radially inward from the shell 1022 to connect to the shaft 1018.

More specifically, the shaft portions 1087 can surround or substantially surround the drive shaft 1018 and can be connected thereto. The radially inner portion 1088 can extend substantially radially from the hub or shaft portion 1087 and can be connected to the middle portion 1089. The middle portion 1089 can be connect to the radially inner portion 1088 by a bend or curve 1091 and the middle portion 1089 can extend radially and circumferentially from the inner portion 1088 and can be arcuate or curved in some examples. The middle portion 1089 can connect to the radially outer portion 1090 via a second bend or curve 1092 (which can be a curve in an opposite or different direction from the first curve 1091). The radially outer portion 1090 can extend radially outward and somewhat circumferentially from the middle or medial portion 1089.

In operation of some examples, during rotation of the roller 1005 and engagement with a floor surface, a force applied to the roller and transferred to the shaft 1018 can be increased each time one of the spokes 1086 aligns with the floor surface (when the radially outer portion is aligned with a direction normal to the floor surface). This creates an intermittent force applied to the shaft with each passing spoke, which can create a dynamic force profile on the shaft (and therefore motor) which can cause undesirable roller operation characteristics such as a chattering noise. The roller 1005 can help to mitigate these issues by including spokes 1086 that can be compliant in a radial direction under a compressive load. When the normal force from the floor surface (or reaction force caused by the weight of the robot) is transferred to the spokes 1086, the spokes 1086 can help to reduce transmission of the force to the shaft 1018 such as by flexing under load and then returning to shape as the force is removed following continued rotation of the roller 1005. The spokes 1086 can also be oriented with the direction of rotation R or shaped to have sufficient strength in tension to pull the sheath 1020 when the spokes 1086 rotate past the floor surface (and past the weight force), allowing the roller 1005 to rotate normally. The relatively long middle portion 1089 and the bends 1091 and 1092 can allow for such movement of the spoke 1086 under compression (by the shaft 1018 and the floor surface).

In some examples, the radially inner portion 1088 can extend a first radial distance and the middle portion 1089 can extend a circumferential distance greater than the radial distance. In some examples, the spokes 1086 can be evenly circumferentially spaced around an axis 1026 of the roller 1005, but the spokes 1086 can be spaced unevenly in other examples. In some examples, the spokes have a uniform thickness between the drive shaft 1018 and the sheath 1022. In some examples, the spokes 1086 can be circumferentially located between two of the vanes, as discussed below with respect to FIGS. 11 and 12 in further detail.

Figure 11:
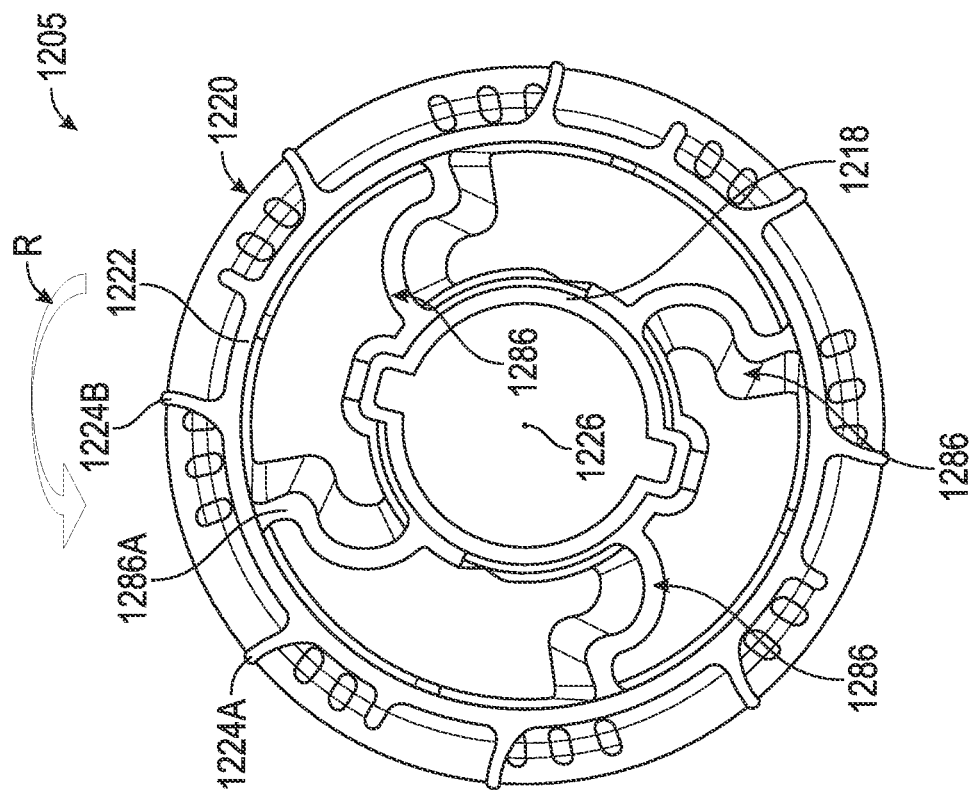
FIG. 11 is a cross-sectional end view of a roller.
Figure 12:
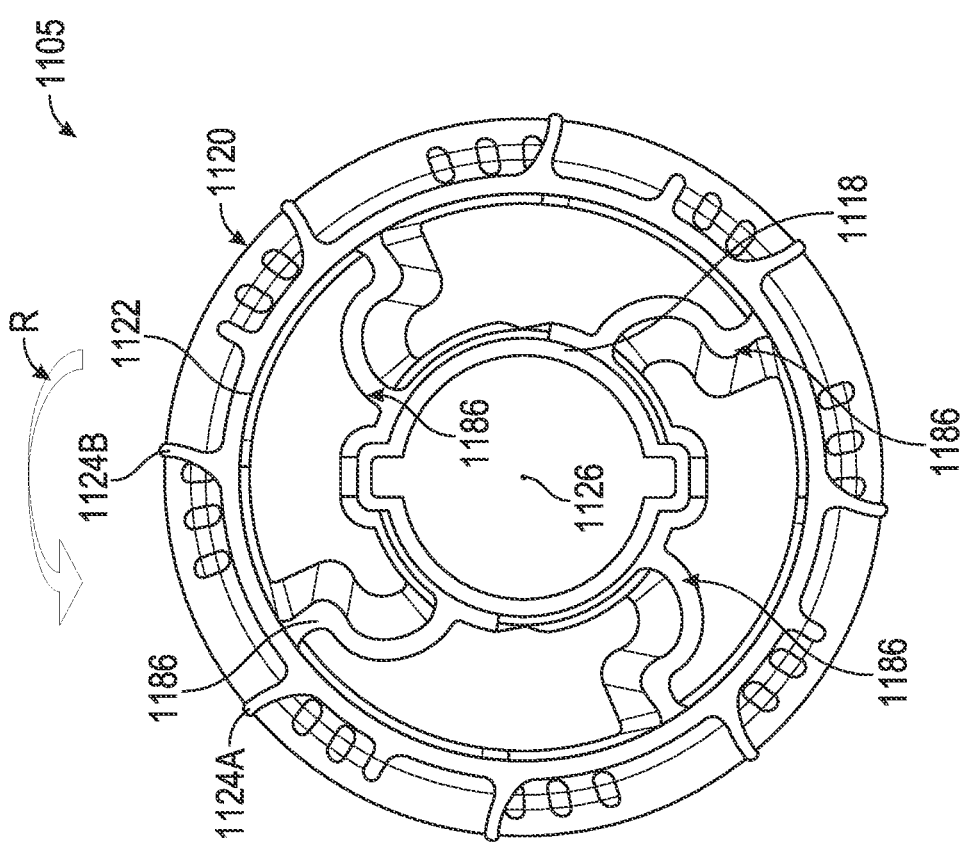
FIG. 12 is a cross-sectional end view of a roller.

FIG. 11 is a cross-sectional end view of a roller 1105. FIG. 12 is a cross-sectional end view of a roller 1205. FIGS. 11 and 12 are discussed below concurrently. FIG. 11 shows a roller 1105 includes a shaft 1118, a sheath 1120 including a shell 1122, vanes 1124, and spokes 1186. Similarly, FIG. 12 shows a roller 1205 includes a shaft 1218, a sheath 1220 including a shell 1222, vanes 1224, and spokes 11286. FIGS. 11 and 12 also show an axis of the shaft 1126 and 1226, respectively. The rollers 1105 and 1205 can be similar to the rollers discussed above; however, the spokes 1286 of the roller 1205 can be clocked or spaced circumferentially between the vanes 1224. Any of the previously discussed rollers can include such spokes.

More specifically, the spokes 1286 can be spaced circumferentially between the vanes 1224. For example, the spoke 1286a can be circumferentially spaced between the vanes 1224a and 1224b. Such spacing can help to improve a force profile during operation of the roller.

That is, during rotation of the roller 1205 and engagement with a floor surface, a force applied to the roller and transferred to the shaft 1218 is increased each time one of the vanes 1224 engages the floor. Similarly, a force transferred to the shaft 1218 can increase each time a spoke aligns with the floor surface. These intermittent forces applied to the shaft can create a dynamic force profile on the shaft (and therefore motor) which can cause undesirable roller operation characteristics such as chattering. The roller 1205 can help to address these issues such as by connect the spokes 1286 to the shell 1222 of the sheath in the middle of the vanes 1224 (or nearly evenly circumferentially spaced between the vanes). This can cause the force from the spoke 1286 to be evenly temporally spaced during rotation between forces from the vanes, which can help to balance or distribute the dynamic load profile of the shaft 1218.

Figure 14:
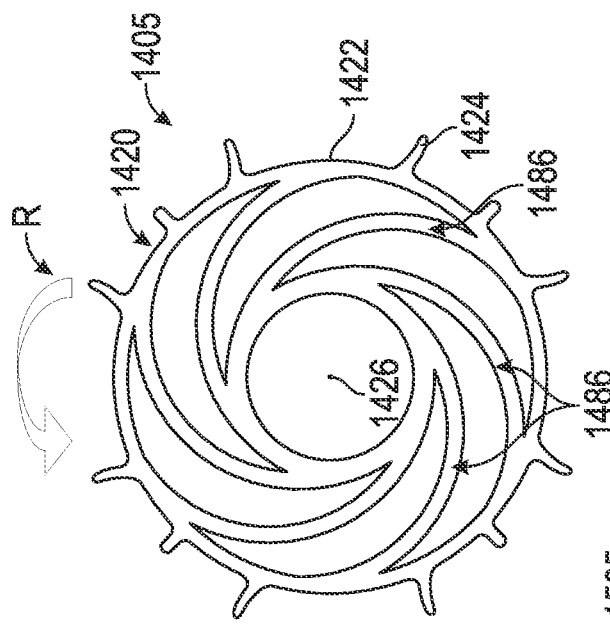
FIG. 14 is a cross-sectional end view of a roller.
Figure 15:
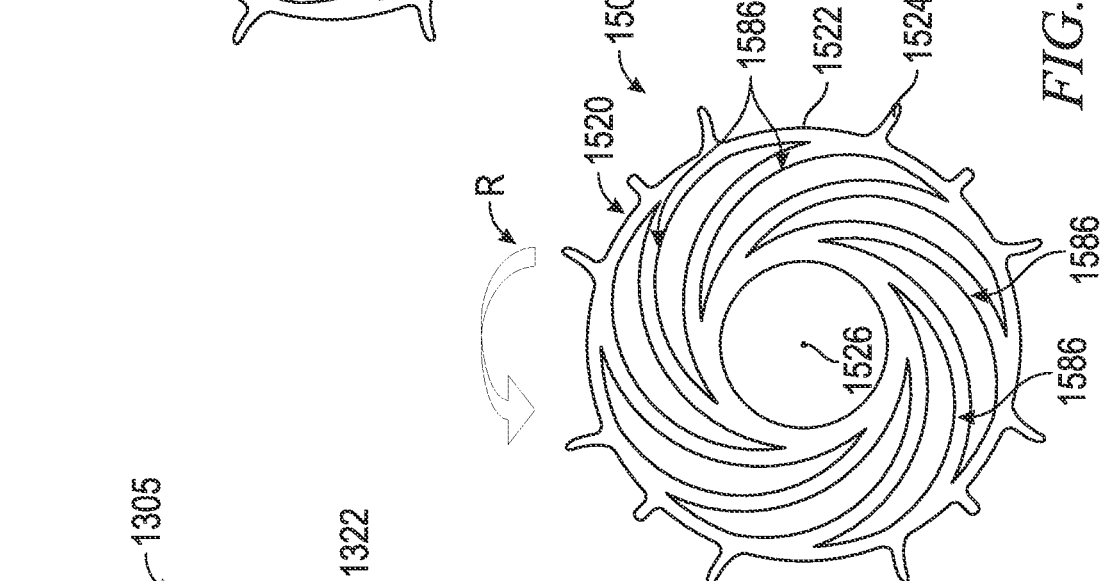
FIG. 15 is a cross-sectional end view of a roller.
Figure 13:
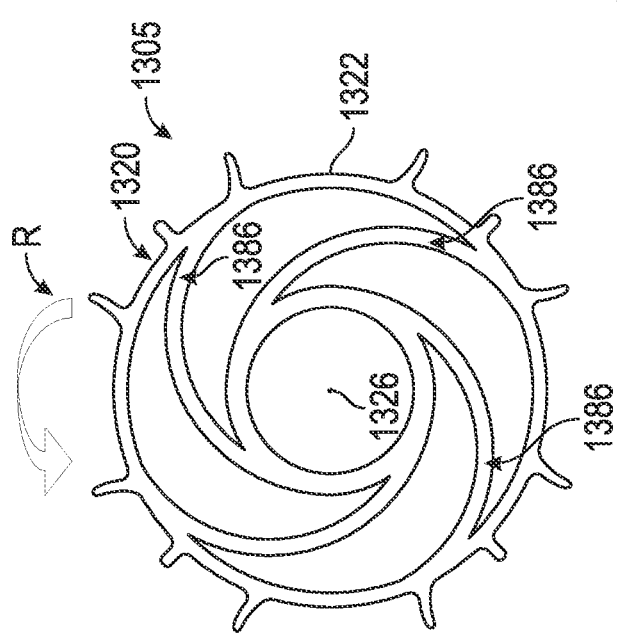
FIG. 13 is a cross-sectional end view of a roller.

FIG. 13 is a cross-sectional end view of a roller 1305. FIG. 14 is a cross-sectional end view of a roller 1405. FIG. 15 is a cross-sectional end view of a roller 1505.

The roller 1305 can include a plurality of spokes 1386 where one or more of the spokes 1386 can form a spiral between a drive shaft and a sheath 1320 of a shell 1322 of the roller. Spokes forming a spiral in cross-section between the sheath 1320 and a shaft of the roller 1305 can allow the spokes 1386 and therefore the shell 1322 to compress under compression (by the shaft 1018 and the floor surface) while still pulling the sheath 1320 under tension when oriented with the direction of rotation R. Spiral spokes can thereby help to reduce the dynamic force profile applied to a shaft of the roller 1305 while still allowing the roller 1305 to rotate normally. As shown in FIG. 13, the roller 1305 can include 4 spiral spokes. As shown in FIG. 14, the roller 1405 can include 6 spiral spokes. As shown in FIG. 15, the roller 1505 can include 8 spiral spokes. A roller can be modified to include other numbers of spiral spokes, such as 2, 3, 5, 7, 9, 10, 11, 12, or the like.

NOTES AND EXAMPLES

The following, non-limiting examples, detail certain aspects of the present subject matter to solve the challenges and provide the benefits discussed herein, among others.

Example 1 is a roller assembly for a mobile cleaning system for cleaning a work surface, the roller assembly comprising: a drive shaft rotatable about a drive axis, the drive shaft including a driven end and an opposite bushing end; a sheath supported by the drive shaft, the sheath rotatable with the drive shaft, and the sheath including a shell engageable with the work surface; a bushing located about the bushing end of the drive shaft; and a bushing shroud connected to the bushing, the sheath and the drive shaft together rotatable with respect to the bushing and the bushing shroud, the bushing shroud defining a periphery including: an outer portion defining a first radius of curvature; and a recessed portion connected to the outer portion and defining a second radius of curvature different from the first radius of curvature.

In Example 2, the subject matter of Example 1 optionally includes wherein the recessed portion of the periphery defines a clearance to permit a portion of the sheath to deflect radially inward when the sheath contacts the working surface.

In Example 3, the subject matter of Example 2 optionally includes wherein the recessed portion of the periphery provides a clearance to permit a portion of the sheath to deflect radially inward of an outer diameter of the outer portion.

In Example 4, the subject matter of Example 3 optionally includes wherein the shroud is located axially within the shell of the sheath.

In Example 5, the subject matter of any one or more of Examples 1–4 optionally include wherein the recessed portion defines a concavity.

In Example 6, the subject matter of any one or more of Examples 1-5 optionally include wherein the periphery of the bushing shroud has a geometric shape of a polygonal cylinder or a polygonal cylinder with rounded corners and chords.

Example 7 is a roller assembly for a mobile cleaning system for cleaning a work surface, the roller assembly comprising: a drive shaft rotatable about a drive axis, the drive shaft drivable from a driven end; a sheath supported by the drive shaft and rotatable therewith, the sheath including a shell engageable with the work surface; a bushing connected to a bushing end of the drive shaft; and a bushing shroud connected to the bushing, the sheath and the drive shaft together rotatable with respect to the bushing and the bushing shroud, the bushing shroud defining a periphery including: an outer portion; and a recessed portion connected to the outer portion, at least a portion of the recessed portion terminating radially inward of the outer portion, and the recessed portion configured to allow the sheath to deflect radially inward of the outer portion.

In Example 8, the subject matter of Example 7 optionally includes wherein the recessed portion is a flat portion of the bushing shroud.

In Example 9, the subject matter of Example 8 optionally includes wherein the flat portion of the periphery defines a planar outer surface.

In Example 10, the subject matter of any one or more of Examples 8-9 optionally include wherein the recessed portion of the periphery is defined by a chord of a circular projection outline defined by the outer portion.

In Example 11, the subject matter of any one or more of Examples 8-10 optionally include wherein the flat portion of the periphery defines a planar outer surface.

In Example 12, the subject matter of any one or more of Examples 7-11 optionally include wherein a radially outer portion of the periphery terminates radially inward of the shell and wherein the recessed portion of the periphery defines a nadir that is radially inward of the radially outer portion of the periphery.

In Example 13, the subject matter of any one or more of Examples 7-12 optionally include a bushing bracket supporting the bushing shroud; and a bushing shroud mount including a flat, the flat engageable with the bracket to orient the recessed portion of the periphery toward the working surface.

In Example 14, the subject matter of Example 13 optionally includes wherein the bushing shroud includes a plurality of recessed portions terminating radially inward of the outer portion of the periphery, and wherein the bushing shroud mount includes a plurality of flats, each flat engageable with the mount to orient one of the recessed portions of the plurality of recessed portions of the periphery toward the working surface.

In Example 15, the subject matter of Example 14 optionally includes wherein the shroud is located axially within the shell of the sheath.

In Example 16, the subject matter of Example 15 optionally includes wherein the bushing shroud mount extends axially beyond a bushing end of the sheath.

Example 17 is a roller assembly for a mobile cleaning system for cleaning a work surface, the roller assembly comprising: a drive shaft extending longitudinally along and rotatable about a drive axis; a sheath supported by the drive shaft, the sheath rotatable with the drive shaft, and the sheath engageable with the work surface; a bushing connected to the drive shaft; and a bushing shroud connected to the bushing, the sheath and the drive shaft together rotatable with respect to the bushing and the bushing shroud, the bushing shroud defining a periphery including: an outer portion defining a first radius of curvature; and a recessed portion connected to the outer portion and defining a concavity.

In Example 18, the subject matter of Example 17 optionally includes wherein the recessed portion of the periphery defines a clearance to permit a portion of the sheath to deflect radially inward when the sheath contacts the working surface.

In Example 19, the subject matter of Example 18 optionally includes wherein the recessed portion of the periphery provides a clearance to permit a portion of the sheath to deflect radially inward of an outer diameter of the outer portion.

In Example 20, the subject matter of Example 19 optionally includes wherein the shroud is located axially within a shell of the sheath.

Example 21 is a roller assembly for a mobile cleaning system, the roller assembly comprising: a drive shaft rotatable about a drive axis, the drive shaft including a driven portion and bushing portion; a sheath supported by the drive shaft and rotatable therewith to engage a work surface; a bushing connected to the bushing portion of the drive shaft; a bushing support supporting the bushing; and a shroud extension connected to the bushing portion of the shaft, the shroud extension extending longitudinally at least partially into the sheath, and the shroud extension at least partially surrounding the bushing support.

In Example 22, the subject matter of Example 21 optionally includes wherein the bushing portion includes a support portion and a bearing portion extending from the support portion and extending away from the driven portion, the bearing portion connected to the bushing.

In Example 23, the subject matter of Example 22 optionally includes wherein the shroud extension connects to a shaft carrier of the shaft.

In Example 24, the subject matter of Example 23 optionally includes wherein the shroud extension, together with the shaft carrier of the shaft, forms a cap that is sealed to limit debris within the extension from traveling axially beyond the cap toward the driven portion of the shaft.

In Example 25, the subject matter of Example 24 optionally includes wherein the shroud extension includes a collection portion defining a collection diameter smaller than an inner diameter of the sheath.

In Example 26, the subject matter of Example 25 optionally includes wherein the cap defines a cap diameter smaller than the collection diameter.

In Example 27, the subject matter of any one or more of Examples 25-26 optionally include wherein the shroud extension includes a transition portion connected to the collection portion and extending axially toward the driven portion and radially inward to connect to the cap.

In Example 28, the subject matter of Example 27 optionally includes wherein the bushing shroud includes a bushing support portion retaining the bushing therein and a flared portion extending from the bushing support portion axially toward the driven end and extending radially outward.

In Example 29, the subject matter of Example 28 optionally includes wherein the flared portion terminates prior to the cap.

In Example 30, the subject matter of any one or more of Examples 28-29 optionally include wherein the flared portion at least partially defines an axial gap between the flared and the cap and wherein the flared portion at least partially defines a radial gap between the flared portion and the transition portion of the shroud extension or the collection portion of the shroud extension.

Example 31 is a roller assembly for a mobile cleaning system, the roller assembly comprising: a drive shaft rotatable about a drive axis, the drive shaft including a driven end and bushing end; a sheath supported by the drive shaft and rotatable therewith to engage a work surface, the sheath comprising: a shell extending longitudinally along the drive axis and rotatable about the drive axis; and a plurality of vanes spaced around a circumference of the shell, each vane extending radially outward from the shell; and a plurality of spokes connecting the drive shaft to the sheath, each spoke circumferentially located between two of the vanes.

In Example 32, the subject matter of Example 31 optionally includes wherein each spoke includes: a radially inner portion connected to the drive shaft and extending a radial distance; a radially outer portion connected to the sheath and extending radially; and a middle portion connected to the radially inner portion and the radially outer portion.

In Example 33, the subject matter of Example 32 optionally includes wherein the middle portion extends a circumferential distance greater than the radial distance.

In Example 34, the subject matter of any one or more of Examples 31-33 optionally include wherein each spoke forms a spiral between the drive shaft and the sheath.

In Example 35, the subject matter of Example 34 optionally includes wherein the plurality of spokes includes four spokes.

In Example 36, the subject matter of any one or more of Examples 34-35 optionally include wherein the plurality of spokes includes six spokes.

In Example 37, the subject matter of any one or more of Examples 34-36 optionally include wherein the plurality of spokes includes eight spokes.

In Example 38, the subject matter of any one or more of Examples 34-37 optionally include wherein the spokes are evenly circumferentially spaced.

In Example 39, the subject matter of any one or more of Examples 34-38 optionally include wherein the spokes have a uniform thickness between the drive shaft and the sheath.

In Example 40, the apparatuses or method of any one or any combination of Examples 1-39 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A roller assembly for a mobile cleaning system, the roller assembly comprising:
   a drive shaft rotatable about a drive axis, the drive shaft including a driven end and bushing end;
   a sheath supported by the drive shaft and rotatable therewith to engage a floor surface, the sheath comprising:
      a shell extending longitudinally along the drive axis and rotatable about the drive axis; and
      a plurality of vanes circumferentially spaced around the shell, each vane of the plurality of vanes extending radially outward from the shell and configured to engage the floor surface; and
   a plurality of spokes connected to the drive shaft and connected to the sheath between two of the vanes.

2. The roller assembly of claim 1, wherein each spoke of the plurality of spokes includes:
   a radially inner portion connected to the drive shaft and extending a radial distance;
   a radially outer portion connected to the sheath and extending radially inward; and
   a middle portion connected to the radially inner portion and the radially outer portion.

3. The roller assembly of claim 2, wherein the middle portion extends a circumferential distance greater than the radial distance.

4. The roller assembly of claim 1, wherein each spoke of the plurality of spokes forms at least a portion of a spiral between the drive shaft and the sheath.

5. The roller assembly of claim 4, wherein the plurality of spokes includes four spokes.

6. The roller assembly of claim 4, wherein the plurality of spokes includes six spokes.

7. The roller assembly of claim 4, wherein the plurality of spokes includes eight spokes.

8. The roller assembly of claim 4, wherein the plurality of spokes are evenly circumferentially spaced about the drive axis.

9. The roller assembly of claim 4, wherein the plurality of spokes each have a uniform thickness between the drive shaft and the sheath.

10. A roller assembly for a mobile cleaning system, the roller assembly comprising:
    a drive shaft rotatable about a drive axis, the drive shaft including a driven end and bushing end;
    a sheath comprising:
       a shell connected to the drive shaft and rotatable therewith to engage a floor surface, the sheath extending longitudinally along the drive axis; and
       a plurality of vanes circumferentially spaced around the shell, each vane of the plurality of vanes extending radially outward from the shell and configured to engage the floor surface; and
    a plurality of spokes connected to the drive shaft and connected to the sheath.

11. The roller assembly of claim 10, wherein each spoke of the plurality of spokes includes:
    a radially inner portion connected to the drive shaft and extending a radial distance;
    a radially outer portion connected to the sheath and extending radially inward; and
    a middle portion connected to the radially inner portion and the radially outer portion.

12. The roller assembly of claim 11, wherein the middle portion extends a circumferential distance greater than the radial distance.

13. The roller assembly of claim 12, wherein the middle portion has is curved from an axial perspective.

14. The roller assembly of claim 12, wherein the middle portion is shaped to deflect radially under a compressive load applied to the sheath by the floor surface.

15. The roller assembly of claim 12, wherein each spoke of the plurality of spokes connects to the sheath between two vanes of the plurality of vanes.

16. The roller assembly of claim 12, wherein each spoke of the plurality of spokes has a uniform thickness between the drive shaft and the sheath.

17. The roller assembly of claim 12, wherein the middle portion is connected to the radially inner portion by a first bend and wherein the middle portion is connected to the radially outer portion by a second bend.

18. A roller assembly for a mobile cleaning system, the roller assembly comprising:
    a drive shaft rotatable about a drive axis, the drive shaft including a driven end and bushing end;
    a sheath comprising:
       a shell connected to the drive shaft and rotatable therewith to engage a floor surface, the sheath extending longitudinally along the drive axis; and
       a plurality of vanes circumferentially spaced around the shell, each vane of the plurality of vanes extending radially outward from the shell and configured to engage the floor surface; and
    a plurality of spokes connected to the drive shaft and connected to the sheath.

19. The roller assembly of claim 18, wherein each spoke forms at least a portion of a spiral in cross-section between the drive shaft and the sheath.

20. The roller assembly of claim 18, wherein the plurality of spokes includes between four spokes and eight spokes.

* * * * *